US012060791B2

(12) United States Patent
Maus et al.

(10) Patent No.: US 12,060,791 B2
(45) Date of Patent: Aug. 13, 2024

(54) AUTOMATED FILTERING AND NORMALIZATION OF LOGGING DATA FOR IMPROVED DRILLING PERFORMANCE

(71) Applicant: Magnetic Variation Services, LLC, Denver, CO (US)

(72) Inventors: Stefan Maus, Boulder, CO (US); Qianlong Liu, Tucson, AZ (US); Alexander Michael Mitkus, Denver, CO (US); Kenneth Robert McCarthy, Lakewood, CO (US); Jin Sun, Denver, CO (US); Andrew Robert Pare, Littleton, CO (US)

(73) Assignee: MAGNETIC VARIATION SERVICES, LLC, Denver, CO (US)

( * ) Notice: Subject to any disclaimer, the term of this patent is extended or adjusted under 35 U.S.C. 154(b) by 0 days.

(21) Appl. No.: 18/310,530

(22) Filed: May 1, 2023

(65) Prior Publication Data

US 2023/0392497 A1 Dec. 7, 2023

Related U.S. Application Data

(63) Continuation of application No. 16/888,256, filed on May 29, 2020, now Pat. No. 11,649,722.

(Continued)

(51) Int. Cl.

*E21B 49/00* (2006.01)
*E21B 3/02* (2006.01)

(Continued)

(52) U.S. Cl.

CPC ............ *E21B 49/003* (2013.01); *E21B 3/022* (2020.05); *E21B 21/08* (2013.01); *E21B 44/04* (2013.01);

(Continued)

(58) Field of Classification Search

CPC ...... E21B 49/003; E21B 21/08; E21B 21/082; E21B 21/085; E21B 44/00; E21B 44/02; E21B 44/04; E21B 44/06; E21B 45/00

See application file for complete search history.

(56) References Cited

U.S. PATENT DOCUMENTS

| | | | |
|---|---|---|---|
| 11,649,722 | B2 | 5/2023 | Maus et al. |
| 2011/0208431 | A1 | 8/2011 | Skelt |

(Continued)

OTHER PUBLICATIONS

U.S. Appl. No. 16/888,256, "Non-Final Office Action", Aug. 2, 2022, 9 pages.

(Continued)

*Primary Examiner* — Kristyn A Hall

(74) *Attorney, Agent, or Firm* — Kilpatrick Townsend & Stockton LLP

(57) ABSTRACT

Systems and methods for automated filtering and normalization of logging data for improved drilling performance may enable smoothing and amplitude scaling of log data for meaningful comparison and analysis without scaling artefacts. The logging data may be collected from downhole sensors or may be recorded by a control system used for drilling. A computer implemented method may enable industrial scale automated filtering and normalization of logging data, including calibration to a known standard. In particular, the filtering and normalization may be used for stratigraphic analysis to correlate true vertical depth to measured depth along a wellbore.

20 Claims, 21 Drawing Sheets

100
DRILLING SYSTEM
134 132 138 136 140 142 144 158 160 162 156 152 154 168 104 164 102 146 106 153 166 149 148

Related U.S. Application Data

(60) Provisional application No. 62/854,824, filed on May 30, 2019.

(51) Int. Cl.

| | |
|---|---|
| ***E21B 21/08*** | (2006.01) |
| ***E21B 44/04*** | (2006.01) |
| ***E21B 44/06*** | (2006.01) |
| ***E21B 45/00*** | (2006.01) |
| ***E21B 47/06*** | (2012.01) |
| ***G01V 11/00*** | (2006.01) |
| ***G06F 16/9035*** | (2019.01) |

(52) U.S. Cl.
CPC .............. *E21B 44/06* (2013.01); *E21B 45/00* (2013.01); *E21B 47/06* (2013.01); *G01V 11/00* (2013.01); *G06F 16/9035* (2019.01)

(56) References Cited

U.S. PATENT DOCUMENTS

| | | | | |
|---|---|---|---|---|
| 2013/0116998 | A1 | 5/2013 | Shirzadi et al. | |
| 2019/0383133 | A1* | 12/2019 | Pollack | E21B 47/022 |

OTHER PUBLICATIONS

U.S. Appl. No. 16/888,256, “Non-Final Office Action”, Feb. 17, 2022, 8 pages.

U.S. Appl. No. 16/888,256, “Notice of Allowance”, Dec. 29, 2022, 5 pages.

* cited by examiner

600

CONTROL ALGORITHM MODULES

| | | |
|---|---|---|
| SLIDE CONTROL EXECUTOR 650 | SLIDE CONTROL CONFIGURATION PROVIDER 652 | BHA & PIPE SPECIFICATION PROVIDER 654 |
| BOREHOLE GEOMETRY MODEL 656 | TOP DRIVE ORIENTATION IMPACT MODEL 658 | TOP DRIVE OSCILLATOR IMPACT MODEL 660 |
| ROP IMPACT MODEL 662 | WOB IMPACT MODEL 664 | DIFF. PRESSURE IMPACT MODEL 666 |
| TORQUE MODEL 668 | TOOL FACE PROJECTION 670 | TOOL FACE CONTROL EVALUATOR 672 |
| TOP DRIVE ADJUSTMENT CALCULATOR 674 | OSCILLATOR ADJUSTMENT CALCULATOR 676 | AUTO DRILLER ADJUSTMENT CALCULATOR 678 |

FIG. 6

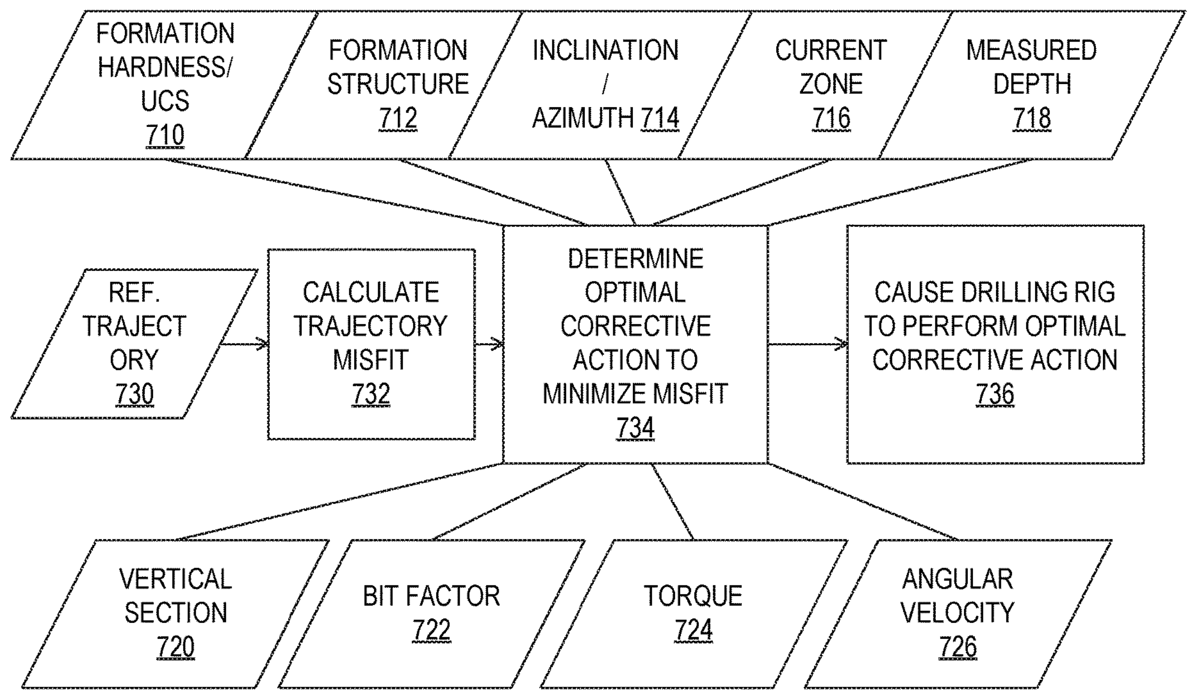

Figure 11:
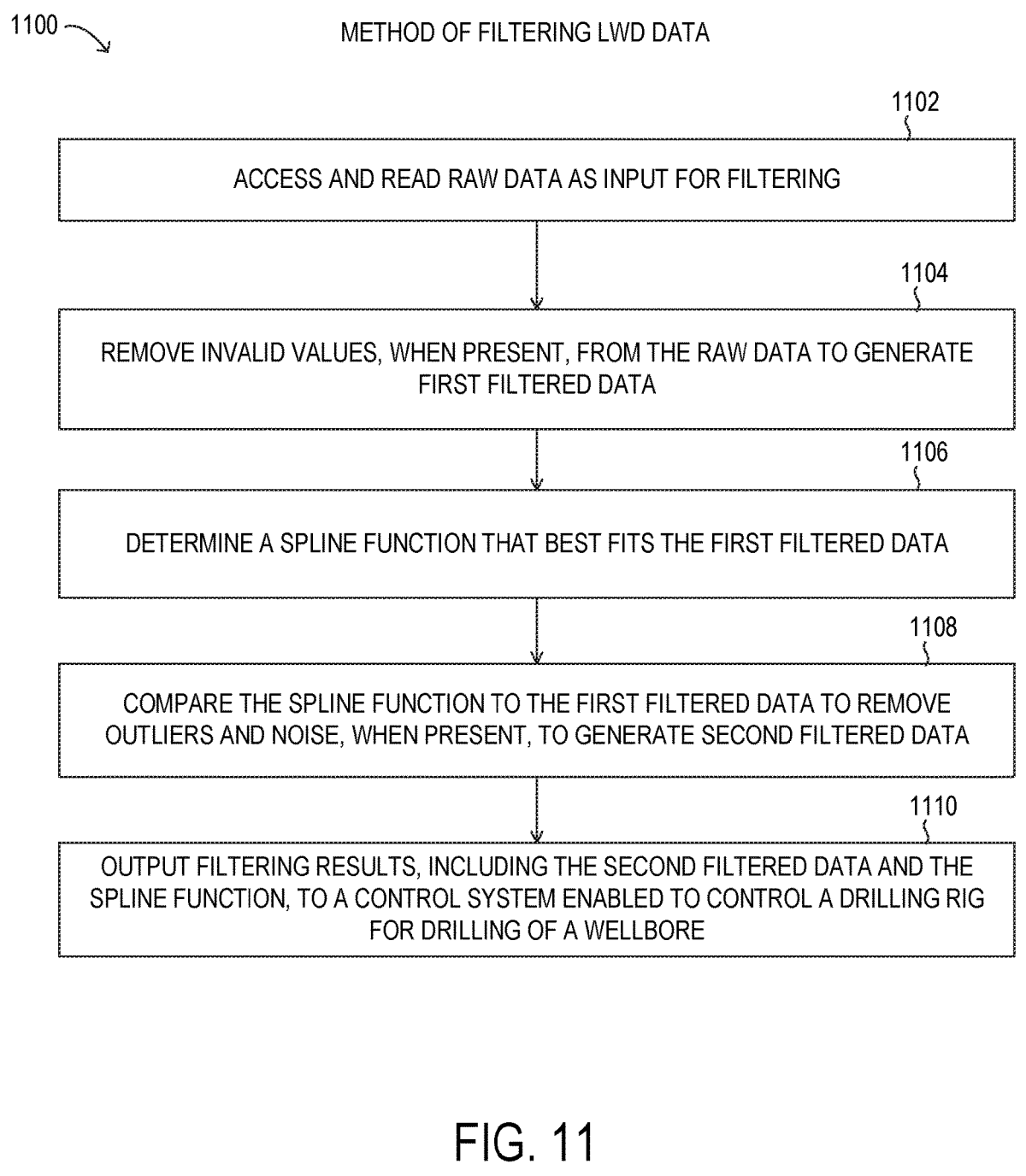

METHOD OF FILTERING LWD DATA

1102 ACCESS AND READ RAW DATA AS INPUT FOR FILTERING

1104 REMOVE INVALID VALUES, WHEN PRESENT, FROM THE RAW DATA TO GENERATE FIRST FILTERED DATA

1106 DETERMINE A SPLINE FUNCTION THAT BEST FITS THE FIRST FILTERED DATA

1108 COMPARE THE SPLINE FUNCTION TO THE FIRST FILTERED DATA TO REMOVE OUTLIERS AND NOISE, WHEN PRESENT, TO GENERATE SECOND FILTERED DATA

1110 OUTPUT FILTERING RESULTS, INCLUDING THE SECOND FILTERED DATA AND THE SPLINE FUNCTION, TO A CONTROL SYSTEM ENABLED TO CONTROL A DRILLING RIG FOR DRILLING OF A WELLBORE

Figure 15:
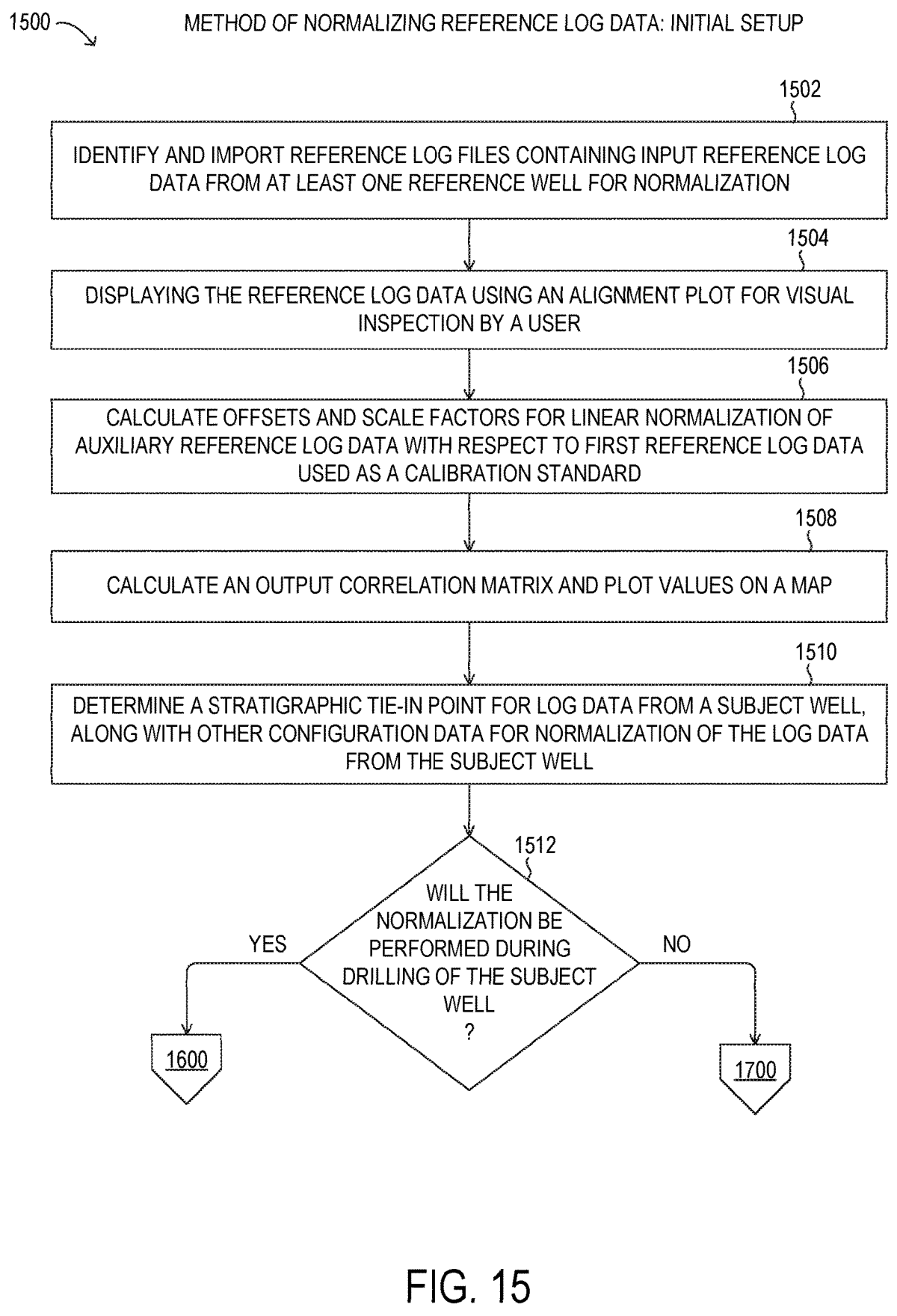

METHOD OF NORMALIZING REFERENCE LOG DATA: INITIAL SETUP

1502 IDENTIFY AND IMPORT REFERENCE LOG FILES CONTAINING INPUT REFERENCE LOG DATA FROM AT LEAST ONE REFERENCE WELL FOR NORMALIZATION

1504 DISPLAYING THE REFERENCE LOG DATA USING AN ALIGNMENT PLOT FOR VISUAL INSPECTION BY A USER

1506 CALCULATE OFFSETS AND SCALE FACTORS FOR LINEAR NORMALIZATION OF AUXILIARY REFERENCE LOG DATA WITH RESPECT TO FIRST REFERENCE LOG DATA USED AS A CALIBRATION STANDARD

1508 CALCULATE AN OUTPUT CORRELATION MATRIX AND PLOT VALUES ON A MAP

1510 DETERMINE A STRATIGRAPHIC TIE-IN POINT FOR LOG DATA FROM A SUBJECT WELL, ALONG WITH OTHER CONFIGURATION DATA FOR NORMALIZATION OF THE LOG DATA FROM THE SUBJECT WELL

1512 WILL THE NORMALIZATION BE PERFORMED DURING DRILLING OF THE SUBJECT WELL ?

YES → 1600

Figure 17:
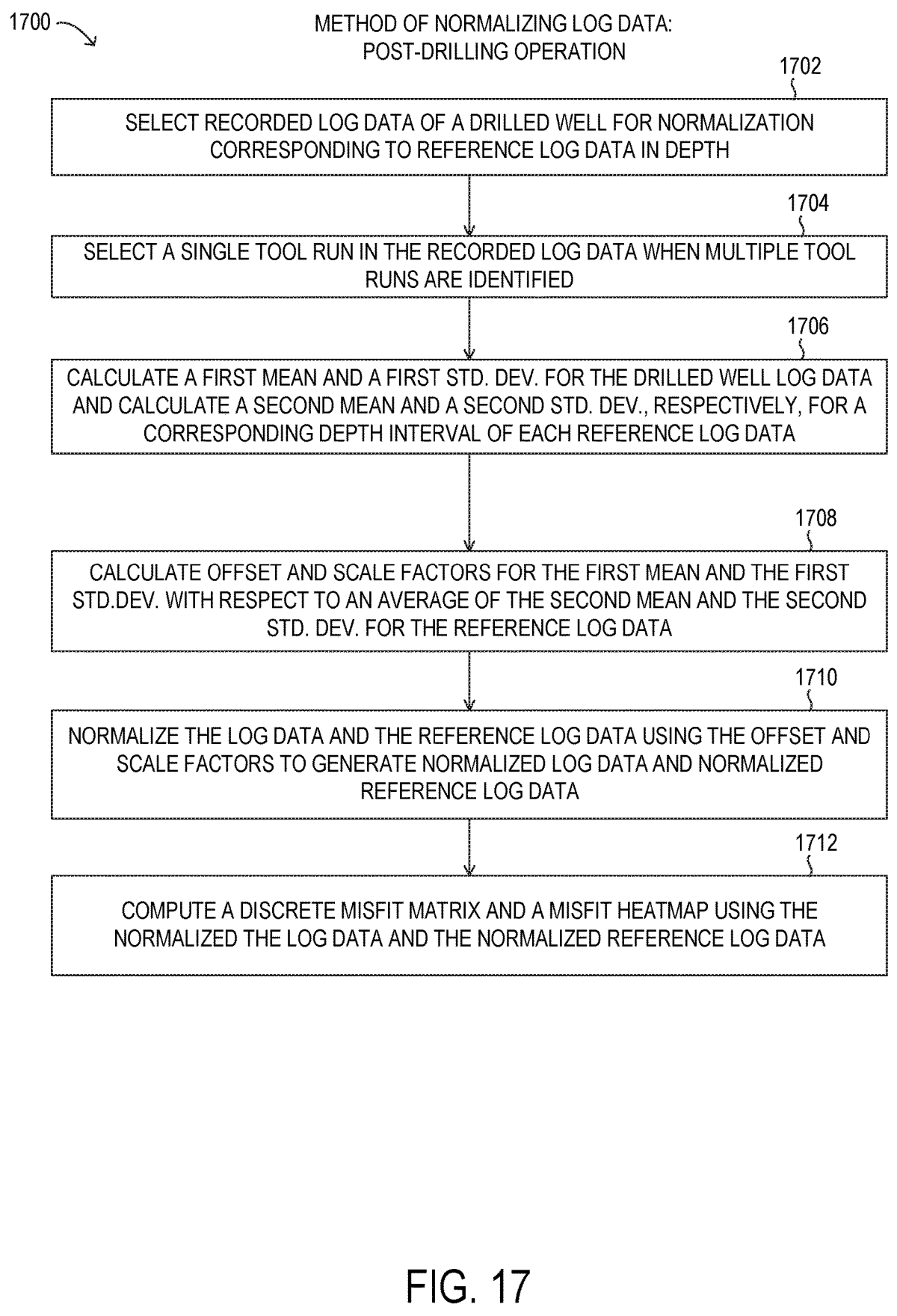

METHOD OF NORMALIZING LOG DATA: POST-DRILLING OPERATION

1702 SELECT RECORDED LOG DATA OF A DRILLED WELL FOR NORMALIZATION CORRESPONDING TO REFERENCE LOG DATA IN DEPTH

1704 SELECT A SINGLE TOOL RUN IN THE RECORDED LOG DATA WHEN MULTIPLE TOOL RUNS ARE IDENTIFIED

1706 CALCULATE A FIRST MEAN AND A FIRST STD. DEV. FOR THE DRILLED WELL LOG DATA AND CALCULATE A SECOND MEAN AND A SECOND STD. DEV., RESPECTIVELY, FOR A CORRESPONDING DEPTH INTERVAL OF EACH REFERENCE LOG DATA

1708 CALCULATE OFFSET AND SCALE FACTORS FOR THE FIRST MEAN AND THE FIRST STD.DEV. WITH RESPECT TO AN AVERAGE OF THE SECOND MEAN AND THE SECOND STD. DEV. FOR THE REFERENCE LOG DATA

1710 NORMALIZE THE LOG DATA AND THE REFERENCE LOG DATA USING THE OFFSET AND SCALE FACTORS TO GENERATE NORMALIZED LOG DATA AND NORMALIZED REFERENCE LOG DATA

1712 COMPUTE A DISCRETE MISFIT MATRIX AND A MISFIT HEATMAP USING THE NORMALIZED THE LOG DATA AND THE NORMALIZED REFERENCE LOG DATA

USER INTERFACE: ENTIRE WELL

2100

USER INTERFACE: AUXILIARY REFERENCE LOG DATA

AUTOMATED FILTERING AND NORMALIZATION OF LOGGING DATA FOR IMPROVED DRILLING PERFORMANCE

CROSS-REFERENCES TO RELATED APPLICATIONS

This application is a continuation of U.S. patent application Ser. No. 16/888,256, filed May 29, 2020, which claims the benefit of priority of U.S. Provisional Patent Application Ser. No. 62/854,824, which was filed on May 30, 2019, which is incorporated herein by reference in its entirety.

BACKGROUND OF THE INVENTION

Filed of the Disclosure

The present disclosure provides systems and methods useful for automated filtering and normalization of logging data for improved drilling performance. The systems and methods can be can be computer-implemented using processor executable instructions for execution on a processor and can accordingly be executed with a programmed computer system.

Description of the Related Art

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

The determination of the well trajectory from a downhole survey may involve various calculations that depend upon reference values and measured values. However, various internal and external factors may adversely affect the downhole survey and, in turn, the determination of the well trajectory.

Various types of logging tools may be used to infer the stratigraphic position of the wellbore when steering a drill bit toward one or multiple geological target formations. Logging data are also used to verify the performance of the drilling process. The logging data from the measurement sensors may include certain anomalies, such as erroneous values caused by measurement errors or data transmission errors or both, among other types of anomalies such as outliers and noise. Furthermore, some anomalies may represent scaling artefacts that may result from mismatched scaling of data from different sources. Such scaling artefacts are not information in the data, but are artificial anomalies that may make meaningful comparison and analysis difficult or impossible. Although a human operator can visually detect such anomalies and can manually exclude the anomalies for interpretation of the logging data, manual processing of logging data may not be desirable or feasible due to human variability, human errors, or delays, particularly within the short time constraints that may apply during drilling. Furthermore, a human operator may not be able to accurately or precisely normalize the amplitude of different sets of measured data to each other, or to a known reference data set.

BRIEF DESCRIPTION OF THE DRAWINGS

For a more complete understanding of the present invention and its features and advantages, reference is now made to the following description, taken in conjunction with the accompanying drawings, in which:

FIG. 6 is a depiction of algorithm modules used by the rig control systems;

FIG. 7 is a depiction of a steering control process used by the rig control systems;

FIG. 11 is a flow chart depicting a method of filtering logging while drilling (LWD) data;

FIG. 15 is a flow chart depicting a method of normalizing reference log data, initial setup;

FIG. 17 is a flow chart depicting a method of normalizing log data, post-drilling operation;

SUMMARY

Figure 1:
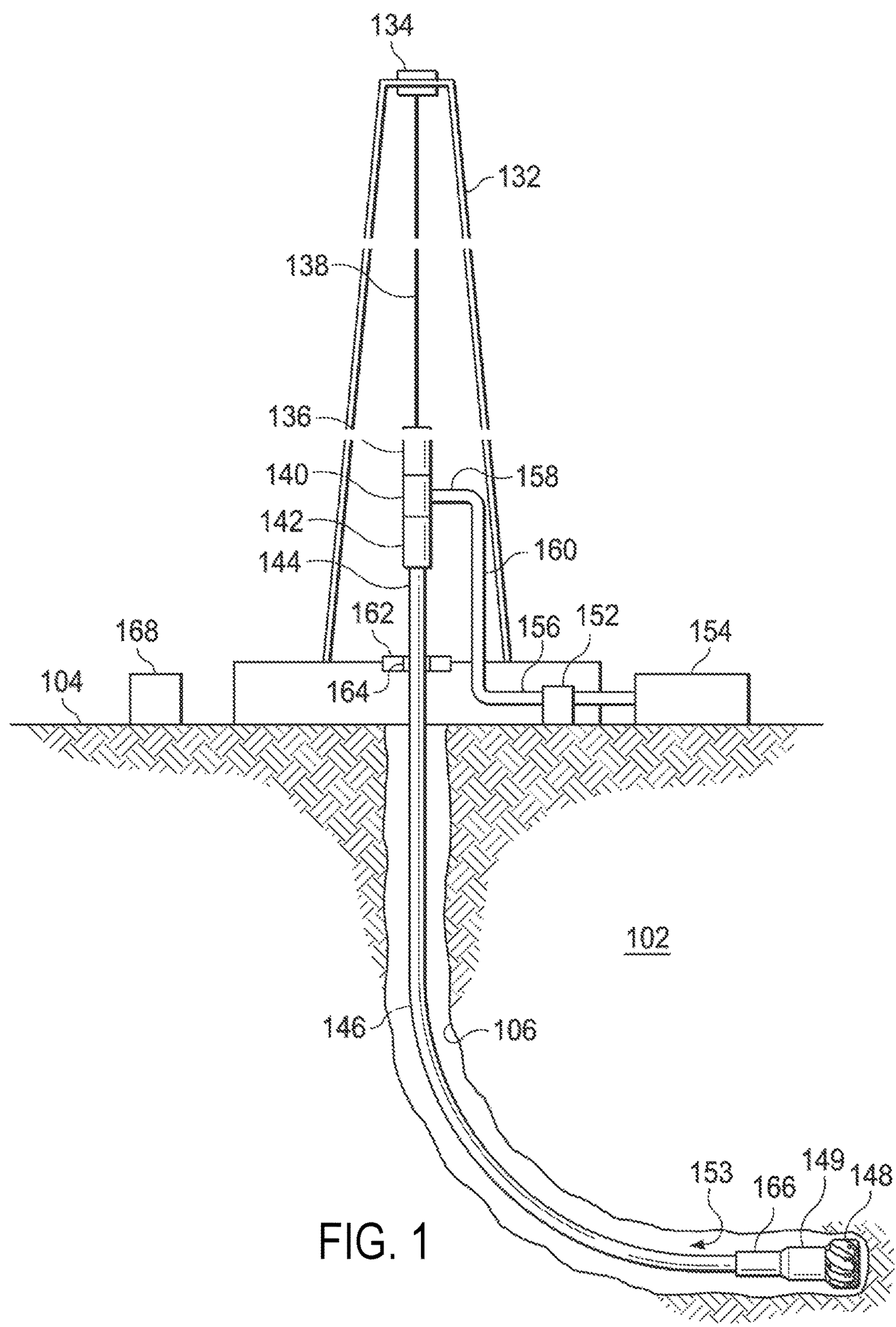
FIG. 1 is a depiction of a drilling system for drilling a borehole.

In one aspect, a computer-implemented method for processing of logging data associated with drilling is disclosed. The method may include obtaining, by a computer system, raw logging data for filtering of the raw logging data by the computer system. The method may include filtering, by the computer system, invalid values, when present in the raw logging data, from the raw logging data to generate first filtered data, determining a spline function that best fits the first filtered data, and identifying and removing outliers when present in the first filtered data by comparing the spline function to the first filtered data to generate second filtered data. The method may further include outputting at least the spline function and the second filtered data to a control system enabled for controlling a drilling rig for drilling of a wellbore.

In any of the disclosed embodiments, the method may include drilling the wellbore using the control system, updating a well plan for the wellbore with the second filtered data, and displaying an indication of the second filtered data to a user.

In any of the disclosed embodiments of the method, determining the spline function may further include determining spline coefficients and knots based on the first filtered data.

In any of the disclosed embodiments of the method, the invalid values may include at least one of: a non-a-number (NaN) value; a zero value; a duplicate value; and an artificial value.

In any of the disclosed embodiments of the method, comparing the spline function to the first filtered data may further include applying an adaptive standard deviation filter to the first filtered data.

In any of the disclosed embodiments, the method may further include iteratively repeating the steps of determining the spline function that best fits the first filtered data and identifying and removing outliers.

In any of the disclosed embodiments of the method, the second filtered data may include logging data for the wellbore from a plurality of tool runs, while the method may further include, from the logging data, identifying first logging data for a first tool run in the plurality of tool runs, identifying respective subsequent logging data associated with subsequent tool runs; and, prior to generating the first normalized data, normalizing the subsequent logging data to the first logging data.

In any of the disclosed embodiments, the method may further include obtaining master reference log data for the wellbore, the master reference log data indicative of stratigraphy of the wellbore.

In any of the disclosed embodiments of the method, obtaining the master reference log data may further include identifying and importing reference log files containing input reference log data from at least one reference well for normalization, displaying the input reference log data using an alignment plot for visual inspection, determining the master reference log data from the input reference log data for use as a calibration standard, calculating reference offsets and reference scale factors for linear normalization of remaining input reference log data, when present, with respect to the master reference log data to generate auxiliary reference log data, calculating an amplitude normalization of the second filtered data with respect to the master reference log data and the auxiliary reference log data, when present, to generate first normalized data, and outputting at least the first normalized data to the control system.

In any of the disclosed embodiments, the method may further include calculating and displaying an indication of an output correlation matrix, and determining a stratigraphic tie-in point for the second filtered data with respect to the master reference log data and the auxiliary reference log data, when present, for the amplitude normalization of the second filtered data.

In any of the disclosed embodiments, the method may further include continuing drilling of the wellbore and generating new logged data using a first log tool, applying the method of claim 1 to generate a second spline function and third filtered data from the new logged data, calculating a second amplitude normalization of the third filtered data to the second filtered data, and concatenating the third filtered data to the second filtered data to generate fourth filtered data, and calculating a third amplitude normalization of the fourth filtered data to the master reference log data.

In any of the disclosed embodiments of the method, calculating the third amplitude normalization may further include calculating a first mean and a first standard deviation for a depth interval in the fourth filtered data, respectively calculating a second mean and a second standard deviation for the master reference log data and the auxiliary reference log data, and calculating an offset and a scale factor for the first mean and the first standard deviation with respect to an average of the second mean and the second standard deviation.

In any of the disclosed embodiments, the method may further include calculating a discrete misfit matrix and a misfit heatmap using the third amplitude normalization.

In any of the disclosed embodiments of the method, the raw logging data may include logging while drilling data collected during drilling, including any one or more of: gamma ray emission measurements, hardness measurements, neutron density measurements, resistivity measurements, ductility measurements, electrical conductivity measurements, porosity measurements, density measurements, confined compressive strength measurements, sonic velocity measurements, and similar logs and data.

In any of the disclosed embodiments of the method, the raw logging data may include drilling rig parameters collected during drilling, including any one or more of: rate of penetration, weight on bit, mechanical specific energy, torque at the top drive, drilling fluid flow rate, drilling fluid pressure, differential pressure, rotational velocity, and similar logs and data.

In any of the disclosed embodiments, the method may further include, based on the stratigraphic tie-in point, correlating measured depth in the second filtered data with true vertical depth based on the master reference log data and the auxiliary reference log data, when present, where the second filtered data is aligned in depth with the stratigraphy of the wellbore.

In another aspect, a computer system for processing of logging data associated with drilling is disclosed. The computer system includes memory media accessible to a processor, and the processor having access to the memory media that stores instructions executable by the processor. The instructions may include instructions executable for obtaining, by the computer system, raw logging data for filtering of the raw logging data by the computer system, and filtering, by the computer system, invalid values, when present in the raw logging data, from the raw logging data to generate first filtered data. The instructions may further include instructions executable for determining a spline function that best fits the first filtered data; identifying and removing outliers when present in the first filtered data by comparing the spline function to the first filtered data to generate second filtered data; outputting at least the spline function and the second filtered data to a control system enabled for controlling a drilling rig for drilling of a wellbore.

In any of the disclosed embodiments of the computer system, the instructions may further include instructions executable for drilling the wellbore using the control system, updating a well plan for the wellbore with the second filtered data, and displaying an indication of the second filtered data to a user.

In any of the disclosed embodiments of the computer system, the instructions for determining the spline function may further include instructions for determining spline coefficients and knots based on the first filtered data.

In any of the disclosed embodiments of the computer system, the invalid values may include at least one of: a non-a-number (NaN) value, a zero value, a duplicate value, and an artificial value.

In any of the disclosed embodiments of the computer system, the instructions for comparing the spline function to the first filtered data may further include instructions for applying an adaptive standard deviation filter to the first filtered data.

In any of the disclosed embodiments of the computer system, the instructions may further include instructions executable for iteratively repeating the steps of determining the spline function that best fits the first filtered data and identifying and removing outliers.

In any of the disclosed embodiments of the computer system, the second filtered data may include logging data for the wellbore from a plurality of tool runs, while the computer system may further include instructions for, from the logging data, identifying first logging data for a first tool run in the plurality of tool runs, identifying respective subsequent logging data associated with subsequent tool runs, and, prior to generating the first normalized data, normalizing the subsequent logging data to the first logging data.

In any of the disclosed embodiments of the computer system, the instructions may further include instructions executable for obtaining master reference log data for the wellbore, the master reference log data indicative of stratigraphy of the wellbore.

In any of the disclosed embodiments of the computer system, the instructions may further include instructions executable for identifying and importing reference log files containing input reference log data from at least one reference well for normalization, displaying the input reference log data using an alignment plot for visual inspection, determining the master reference log data from the input reference log data for use as a calibration standard, calculating reference offsets and reference scale factors for linear normalization of remaining input reference log data, when present, with respect to the master reference log data to generate auxiliary reference log data, calculating an amplitude normalization of the second filtered data with respect to the master reference log data and the auxiliary reference log data, when present, to generate first normalized data, and outputting at least the first normalized data to the control system.

In any of the disclosed embodiments of the computer system, the instructions may further include instructions executable for calculating and displaying an indication of an output correlation matrix, and determining a stratigraphic tie-in point for the second filtered data with respect to the master reference log data and the auxiliary reference log data, when present, for the amplitude normalization of the second filtered data.

In any of the disclosed embodiments of the computer system, the instructions may further include instructions executable for continuing drilling of the wellbore and generating new logged data using a first log tool, applying the method of claim 1 to generate a second spline function and third filtered data from the new logged data, calculating a second amplitude normalization of the third filtered data to the second filtered data, concatenating the third filtered data to the second filtered data to generate fourth filtered data, and calculating a third amplitude normalization of the fourth filtered data to the master reference log data.

In any of the disclosed embodiments of the computer system, the instructions for calculating the third amplitude normalization may further include instructions for calculating a first mean and a first standard deviation for a depth interval in the fourth filtered data, respectively calculating a second mean and a second standard deviation for the master reference log data and the auxiliary reference log data, and calculating an offset and a scale factor for the first mean and the first standard deviation with respect to an average of the second mean and the second standard deviation.

In any of the disclosed embodiments of the computer system, the instructions may further include instructions executable for calculating a discrete misfit matrix and a misfit heatmap using the third amplitude normalization.

In any of the disclosed embodiments of the computer system, the raw logging data may include logging while drilling data collected during drilling, including any one or more of: gamma ray emission measurements, hardness measurements, neutron density measurements, resistivity measurements, ductility measurements, electrical conductivity measurements, porosity measurements, density measurements, confined compressive strength measurements, sonic velocity measurements, and similar logs and data.

In any of the disclosed embodiments of the computer system, the raw logging data may include drilling rig parameters collected during drilling, including any one or more of: rate of penetration, weight on bit, mechanical specific energy, torque at the top drive, drilling fluid flow rate, drilling fluid pressure, differential pressure, rotational velocity, and similar logs and data.

In any of the disclosed embodiments of the method, the raw logging data may include logging while drilling data collected during drilling In any of the disclosed embodiments of the computer system, the instructions may further include instructions executable for, based on the stratigraphic tie-in point, correlating measured depth in the second filtered data with true vertical depth based on the master reference log data and the auxiliary reference log data, when present, wherein the second filtered data is aligned in depth with the stratigraphy of the wellbore.

DESCRIPTION OF PARTICULAR EMBODIMENT(S)

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from Measurement While Drilling (MWD) and Logging While Drilling (LWD) sensor data, but could also include other reference well data, such as drilling dynamics data or sensor data giving information, for example, on the hardness of the rock in individual strata layers being drilled through.

A method for updating the well plan with additional stratigraphic data may first combine the various parameters into a single characteristic function, both for the subject well and every offset well. For every pair of subject well and offset well, a heat map can be computed to display the misfit between the characteristic functions of the subject and offset wells. The heat maps may then enable the identification of paths (x(MD), y(MD)), parameterized by the measured depth (MD) along the subject well. These paths uniquely describe the vertical depth of the subject well relative to the geology (e.g., formation) at every offset well. Alternatively, the characteristic functions of the offset wells can be combined into a single characteristic function at the location of the subject wellbore. This combined characteristic function changes along the subject well with changes in the stratigraphy. The heat map may also be used to identify stratigraphic anomalies, such as structural faults, stringers and breccia. The identified paths may be used in updating the well plan with the latest data to steer the wellbore into the geological target(s) and keep the wellbore in the target zone.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the tool face, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as tool face and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to the drilling rig, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
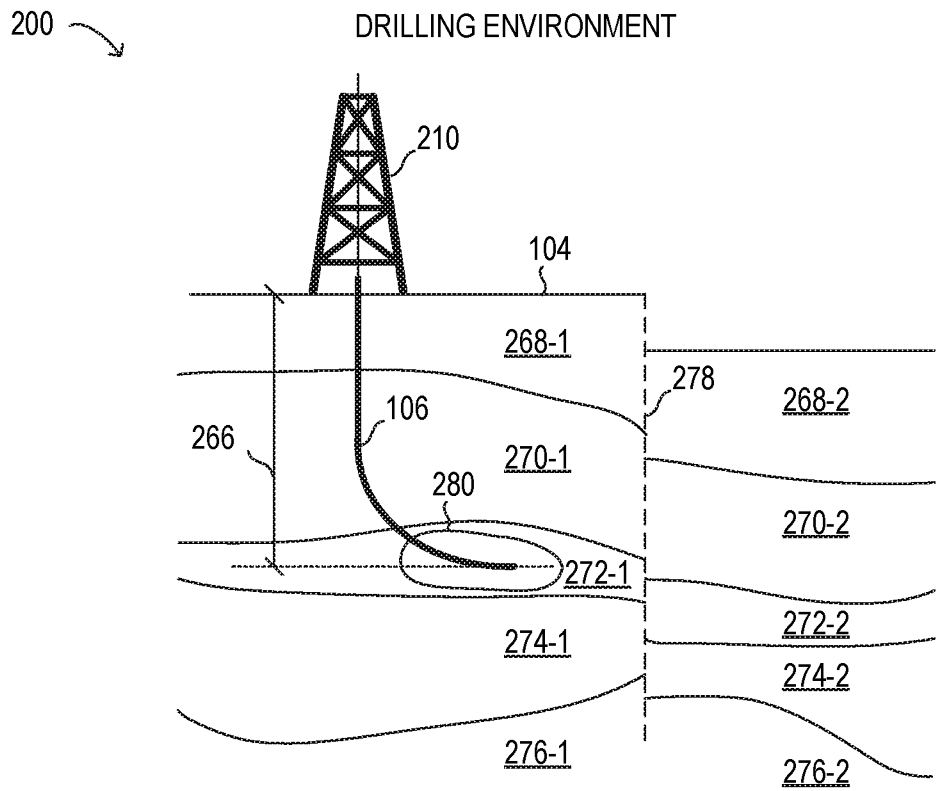
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
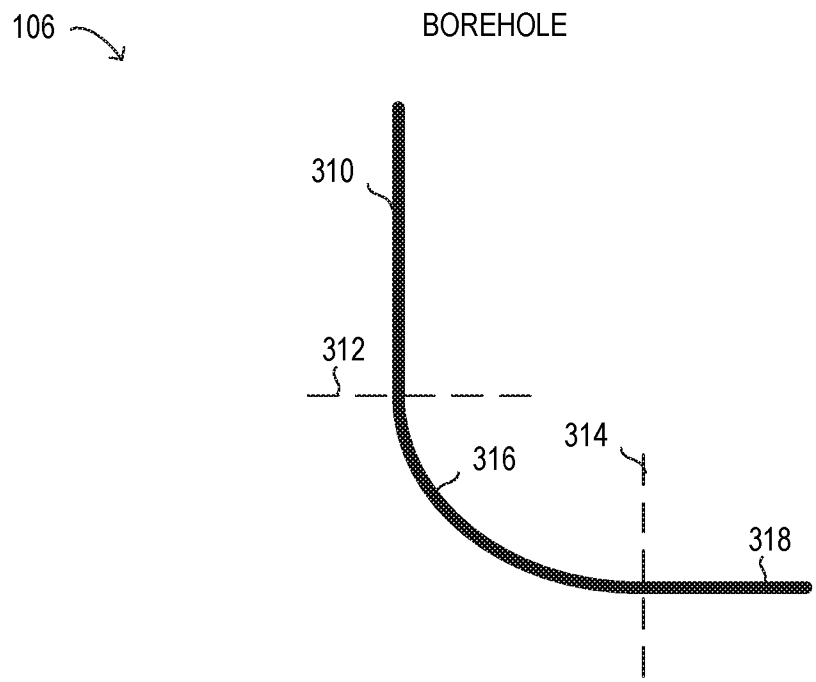
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination in build up section 316 per measured length drilled is referred to herein as a "build rate" and may be defined in degrees per one hundred feet drilled. For example, the build rate may have a value of 6°/100 ft., indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
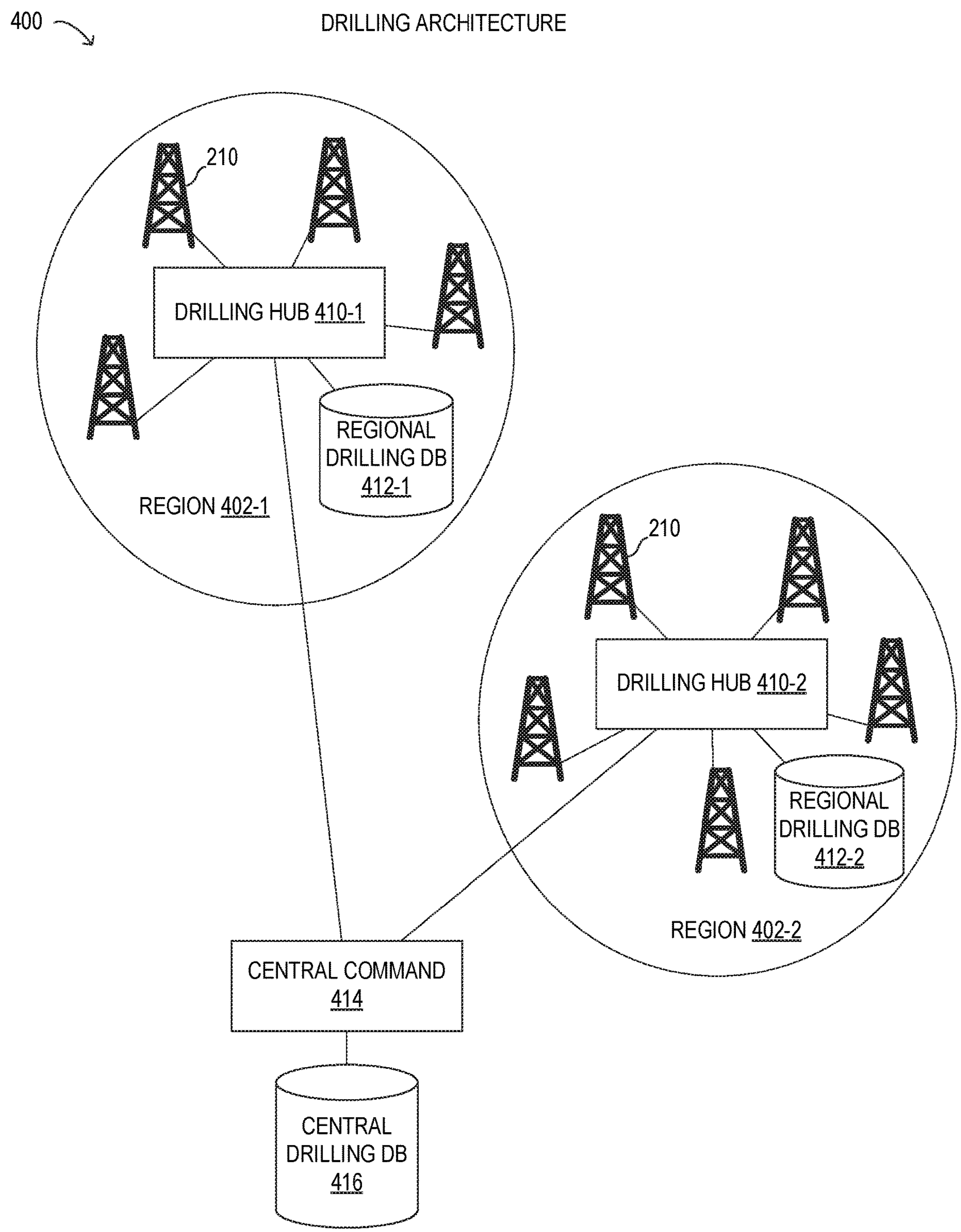
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
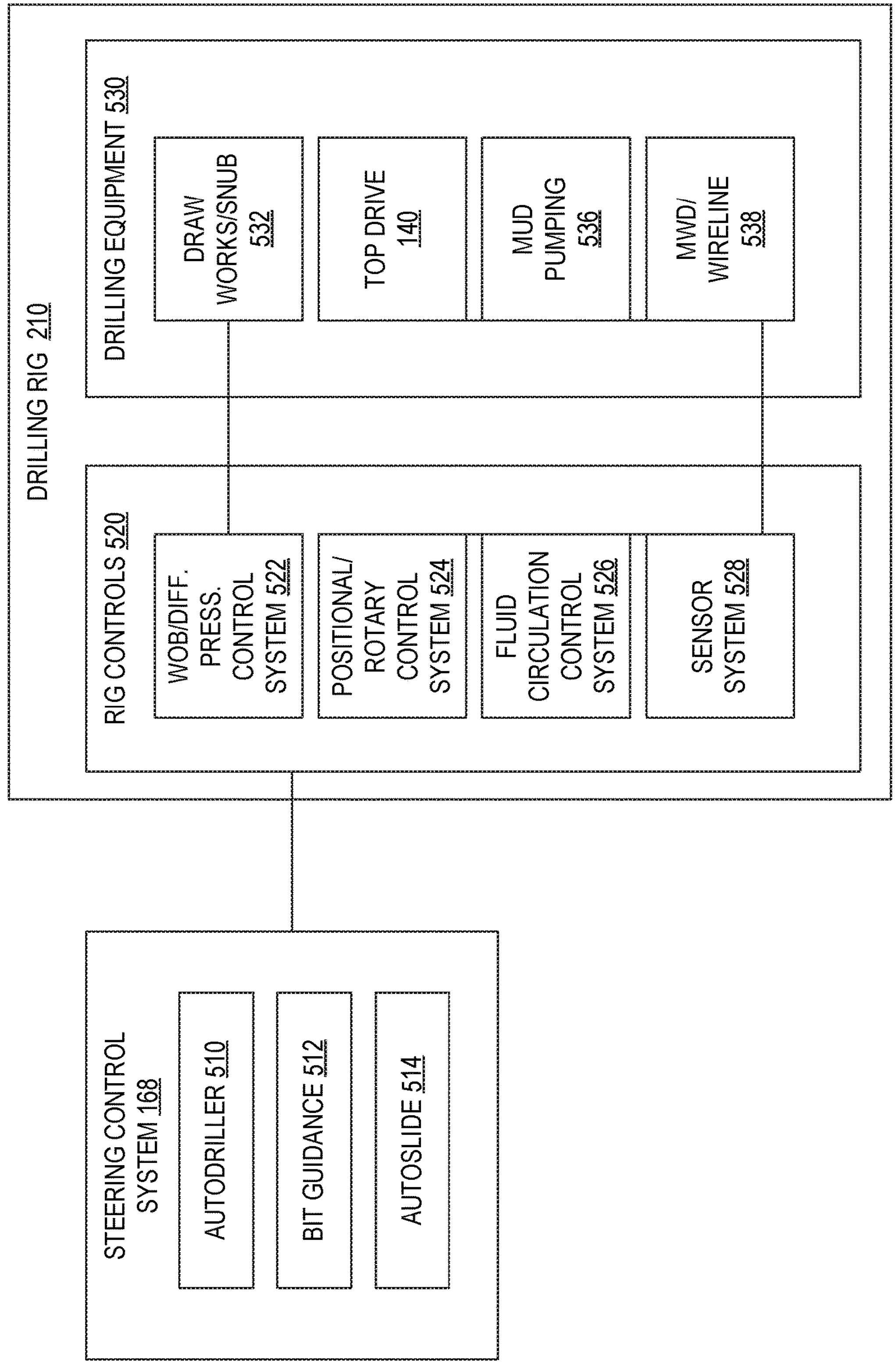
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
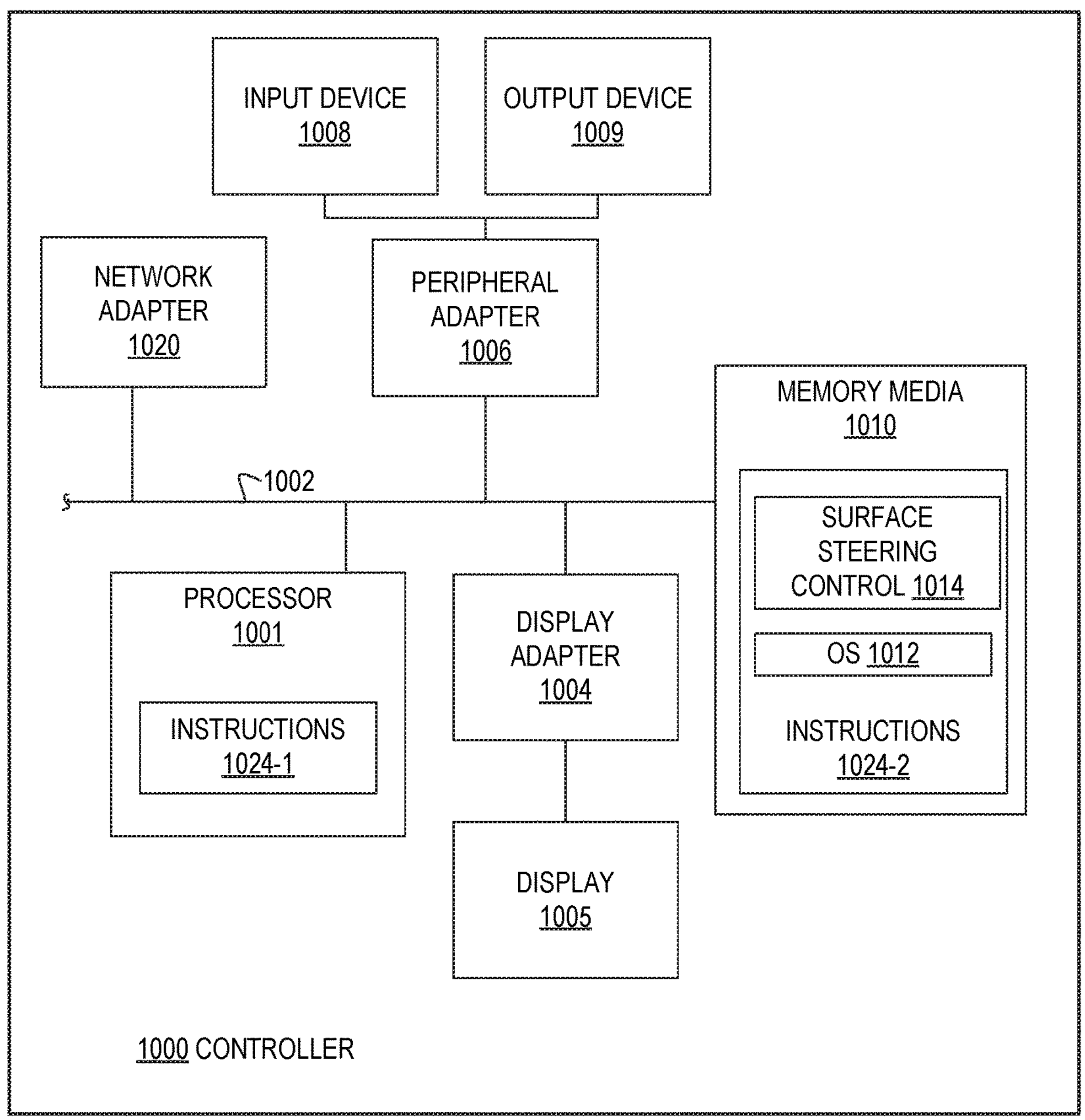
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating all factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
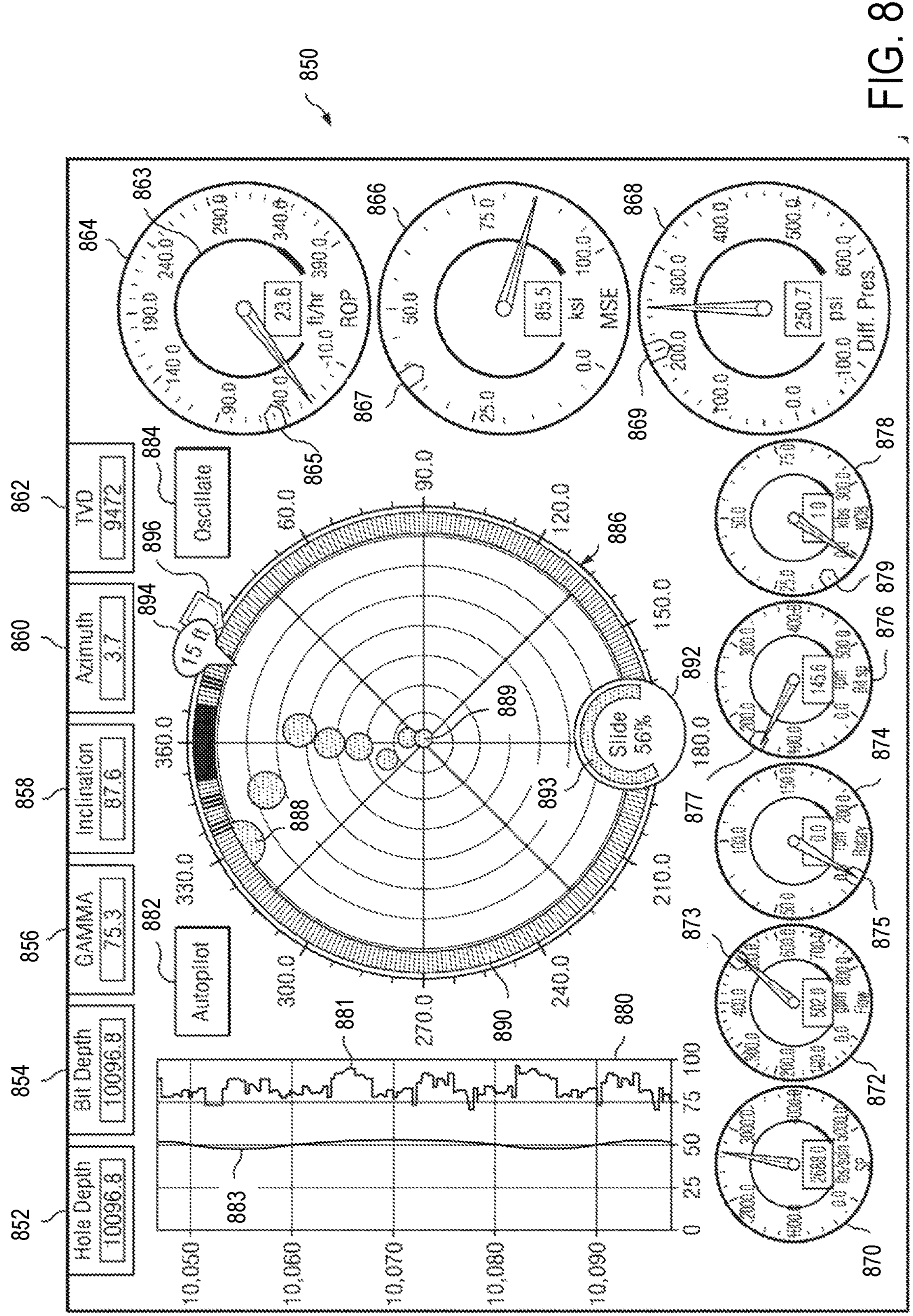
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
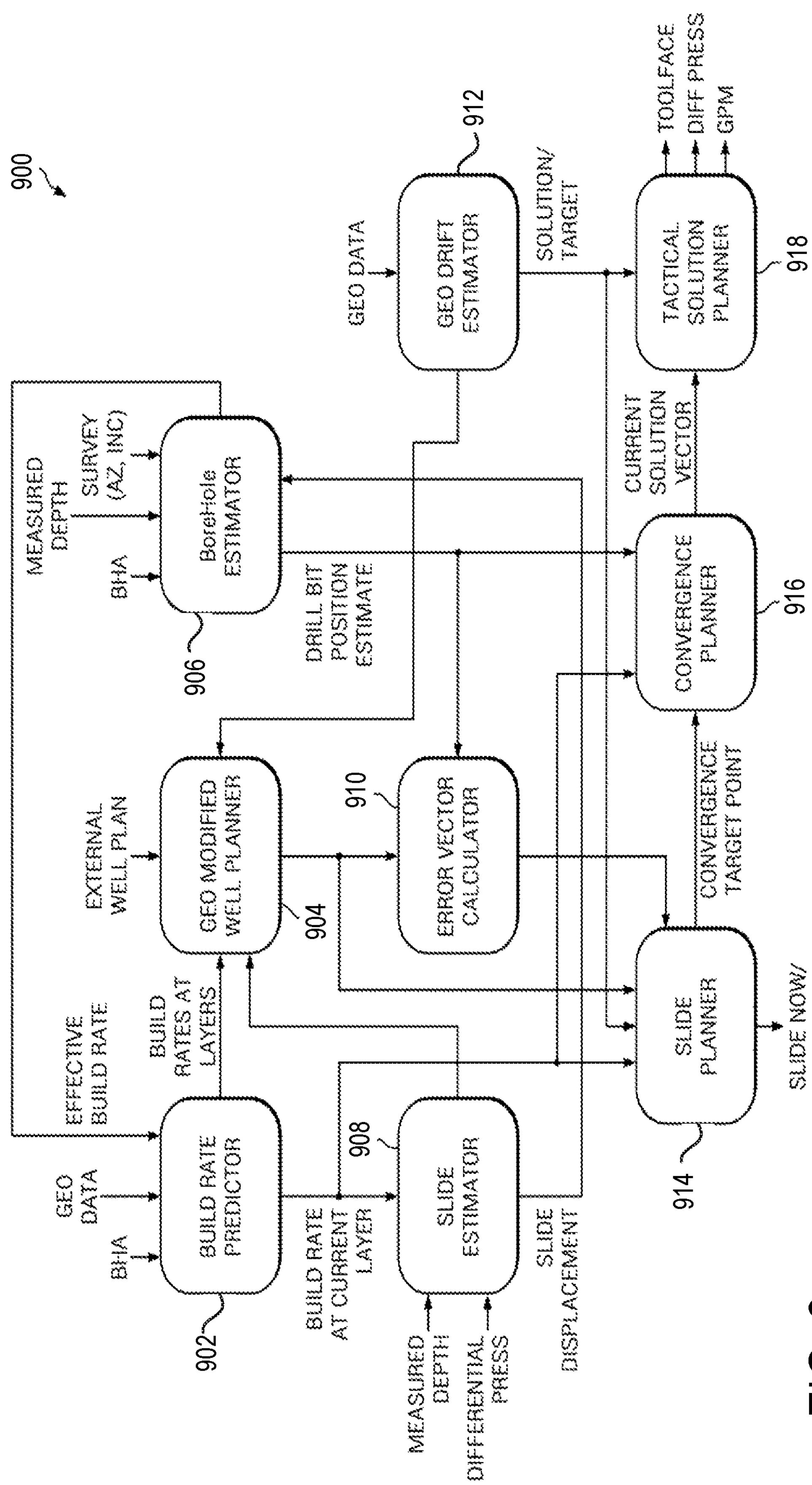
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination as a set point for steering control system 168 to control. For example, the geologist may enter a target to steering control system 168 of 90.5-91.0 degrees of inclination for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/ rotary model, and MSE model. The mud pump model represents mud pump equipment and includes flow rate, standpipe pressure, and differential pressure. The WOB/ differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

In other embodiments of autonomous drilling, including autonomous steering algorithms such as provided by steering control system 168, instead of manual correction of logging data (also referred to herein as simply "log data") received from downhole sensors, executable code (e.g., a software algorithm) executing on a processor is used to pre-process the logging data and remove any undesirable anomalies, such as erroneous values caused by measurement errors or data transmission errors or both. Without such a filter of the anomalies in the logging data, the autonomous steering algorithms can be adversely affected by erroneous data and may not operate as intended, which is undesirable.

Furthermore, in addition to filtering, the executable code, such as code executed using steering control system 168 or code executed in an associated manner, may further be enabled to normalize log data that is used when drilling a subject well, such as LWD data collected during drilling. As noted, various reference log data may be used as a guide to interpret LWD data collected during drilling of a subject well. The various reference log data (also referred to as a "typelog" for a particular well or location of a well) that are used during drilling of the subject well may be specified in the well plan, for example, and may include log data from a plurality of reference wells or a combined log created therefrom. The reference log data are compared with the LWD data to correlate MD with TVD, in order to accurately locate the bit and/or wellbore, especially with respect to one or more geological formations, and steer drilling of the well. One major problem with such comparisons of reference log data to LWD data collected during drilling, or more generally with comparisons of log data from different sources, is that the amplitude axis of the log data may not be scaled to any given reference, or to a known reference. In other words, the scaling of the log data may be arbitrary, and may also depend on various factors, such as the operation and configuration of the LWD tool, or the selection of a log sensor used in the LWD tool. For example, for previously recorded reference log data, tool information or tool calibration values may not be available. Furthermore, even when various log data are available, certain inaccuracies, such as scaling artefacts, may be present in the log data and may make any meaningful comparison or analysis difficult or impossible in some cases. Thus, in addition to filtering log data, the methods and systems disclosed herein are enabled to normalize the log data, such as normalization to a given set of log data or to a given known standard (e.g., representing a calibration to the given standard).

As will be described in further detail, a systems and methods for automated filtering and normalization of logging data for improved drilling performance is disclosed. The systems and methods for automated filtering and normalization of logging data for improved drilling performance disclosed herein may provide an automated approach to identifying and removing (i.e., filtering) anomalies in logging data and providing filtered logging data as clean input into autonomous steering algorithms, such as provided by steering control system 168. The improvement in drilling performance may be particularly relevant for drilling using steering control system 168, which is enabled to drill autonomously and which may be dependent upon the filtered output of the systems and methods for automated filtering and normalization of logging data to attain desired drilling performance. In other words, without the filtered output, steering control system 168 may be adversely affected by incorrect data or other anomalous data, which is undesirable. Further, the systems and methods for automated filtering and normalization of logging data for improved drilling performance disclosed herein may be enabled to normalize the amplitude of different sets of logged data to a common scaling, in order to enable meaningful comparison and analysis of the normalized logged data and, therefore, more accurate location of the wellbore, including during drilling. The normalization may be performed on one or more auxiliary sets of reference log data (e.g., auxiliary typelogs) that are used with a master reference log data. The normalization may also be performed on LWD data collected during drilling, or may be performed post-drilling on LWD data collected for an entire well. The normalization may also be performed among different tool runs that can be performed on the same subject well, such as with different tools or under different conditions, or simply as a result of tripping BHA 149 to surface 104, resulting in a tool run being interrupted and then resumed.

Various aspects of automated filtering and normalization of logging data for improved drilling performance is described herein in a non-limiting manner, including using examples of gamma ray emission downhole measurements as the log data for descriptive clarity. However, the automated filtering and normalization of logging data for improved drilling performance disclosed herein is not so limited and may be applicable to various kinds of drilling data, including downhole, surface and mud logging data. Examples of LWD data that can be used for logging data or log data include gamma ray emission measurements, hardness measurements, neutron density measurements, resistivity measurements, ductility measurements, electrical conductivity measurements, porosity measurements, density measurements, confined compressive strength measurements, and sonic velocity measurements, among other measurements. Examples of drilling parameters that can be used as logging data or log data include rate of penetration (ROP), weight on bit (WOB), mechanical specific energy (MSE), torque at the top drive, drilling fluid flow rate, drilling fluid pressure, differential pressure, and rotational velocity, among others.

A method 1100 of filtering LWD data is shown in FIG. 11 in flowchart form. Method 1100 may be executed by a processor included with steering control system 168, or an associated processor. It is noted that certain operations in method 1100 may be omitted or rearranged in different embodiments.

Method 1100 may begin at step 1102 by accessing and reading raw data as input for filtering. The raw data at step 1102 may be logged data used as input for method 1100. Accessing the raw data may include receiving and reading the input logged data. The algorithms for automated filtering and normalization of logging data may be enabled to receive and read various formats of logged data files as input. In certain embodiments, at least three formats of logged data files may be supported: JavaScript object notation (JSON) format, log ASCII standard (LAS) format, and Microsoft®

Excel® format. For example, at step 1102, the corresponding three software functions may be used with descriptive names such as: readGammaFromJSON, readGammaFromLAS, and readGammaFromExcel. Each of the three functions may operate in a similar manner, with a file name being provided as input, in addition to corresponding indices of measured depth (MD) and gamma ray logs for LAS or Excel files, or specific locations of the MD and gamma ray logs in the JSON files, such as defined by parameters or constant values. Alternatively, the algorithm for automated filtering and normalization of logging data may also access the input data using other methods of data transmission, including by network transmission or by accessing a data repository, and may access the input data without the use of a file as input.

At step 1104, invalid values, when present in the raw data, are identified and removed from the raw data to generate first filtered data. In step 1104, the invalid values may be modified or deleted, for example. In the raw data received as input at step 1102, for example from the Bit Guidance System (BGS) 512, invalid data points of the following categories may be present:

NaN, (i.e., not-a-number as a special coded value);

−999.25 and 0 used for missing values, among other such values that can be identified as artificial values that have been added and do not represent measurement values;

at the start and end boundaries of the raw data, many values may not be from the data transmission but rather are synthetically added, for example, many repeated zero values for gamma ray may have been added as padding; and repeated gamma ray values that are added to interpolate additional MD points, but without actual measurements having been taken for the repeated values.

The above invalid data points can be detected and removed by software functions with descriptive names, such as those like: removeNAN, remove999, removeZero, removeStartAndEndArtificialPoints, and removeRepeatedNumber.

In addition to the above invalid data points, logging data with the same MD value but with different gamma ray values may be received as input. Since such duplicate values at the same MD may be valid duplicate measurements, the gamma ray values are not removed, but rather, the MD values of duplicate points are slightly modified by adding 0.001 to the raw MD value by a software function, such as with the descriptive name slightlyModifyRepeatedMds. The modification is used to accommodate the spline function libraries, which may rely upon strictly ascending and unique MD values to define a range of MD.

At step 1106, a spline function may be determined that best fits the first filtered data. At step 1108, the spline function may be compared to the first filtered data to remove outliers and noise to generate second filtered data. In particular embodiments, the following algorithm can be used at steps 1106 and 1108:

Create internal knots by a software function, such as with the descriptive name create TForSpline. The parameter, nPointsPerKnot, stands for the number of data points in MD between two adjacent knots.

Compute the spline by a software function, such as with the descriptive name LSQUnivariateSpline and evaluate the spline gamma ray values versus MD.

Use a sigma filter to remove points of anomalies, which have values larger than (spline gamma+coeff_sigma*sigma) or less than (spline gamma−coeff_sigma*sigma). Here, sigma is a standard deviation and coeff_sigma is a threshold multiplier for sigma. coeff_sigma is a user defined parameter, and may have values such as 2.0, 2.5, or 3.0. The value of sigma depends on the user provided parameter, opt_sigma. If (opt_sigma==−1), the global standard deviation estimated from the input data is used; if (opt_sigma==−2), the local standard deviation estimated from each segment between two adjacent spline knots is used; otherwise, the user-provided (positive) value of opt_sigma is used as a constant standard deviation. This operation may carried out by a software function having the descriptive name: sigmaFilter.

Repeat the above two operations: spline and filter by a user-defined number of iterations, such as controlled by a user input parameter nIterations. For typical logging data, using values of 1, 2, or 3 for nIterations may produce acceptable results.

The larger the value of nPointsPerKnot, the larger the knot interval, the stronger the smoothing and the less detailed variations in the input data are captured by the spline function. The optimal value may depend on certain characteristics of the first filtered data. Drilling parameters with large genuine variability may be suited for smaller numbers of points per knot, while drilling parameters with less variability, but stronger noise, may be suited for larger numbers of points per knot. For gamma ray logs, nPointsPerKnot in the range of 10 to 20 may be suitable, considering a trade-off between stronger smoothing and stronger remaining noise.

Method 1100 may finish at step 1110, by outputting filtering results, including the second filtered data and the spline function, to a control system enabled to control a drilling rig for drilling of a wellbore. One example of the control system at step 1110 is steering control system 168. After the filtering operations are performed in step 1108, method 1100 may output the values: MDs, gammaFiltered, gammaSpline, spl, spl_coeffs, and spl_knots, which are described below.

MDs is a list of Measured Depth points, after removing anomalies, such as invalid points, outliers, and noise points from the input Measured Depth points.

gammaFiltered and gammaSpline are lists of filtered gamma ray and spline gamma ray values corresponding to the MDs, such that the number of values in gammaFiltered and gammaSpline is equal to the number of values in MDs.

spl is a Python object of the class spline. spl can be used to calculate gamma ray values for any user-given Measured Depth list. For example, given a list MDs_list, spl(MDs_list).tolist( ) may return the corresponding gamma ray value list.

spl_coeffs and spl_knots represent the spline coefficients and knots of the spline object spl.

As described above and shown in method 1100 in FIG. 11, the second filtered data in the filtering results of step 1110 may represent the filtered input logging data that are suitable for use by one or more control systems used for drilling, such as any one or more of rig control systems 500 or another control system used in conjunction with steering control system 168. Thus, when the second filtered data is used by the control systems, the control systems may be enabled to perform drilling operations, including autonomous drilling, with a desired drilling performance or with a desired accuracy or precision resulting from reduced or eliminated errors associated with the logged data.

Figure 12:
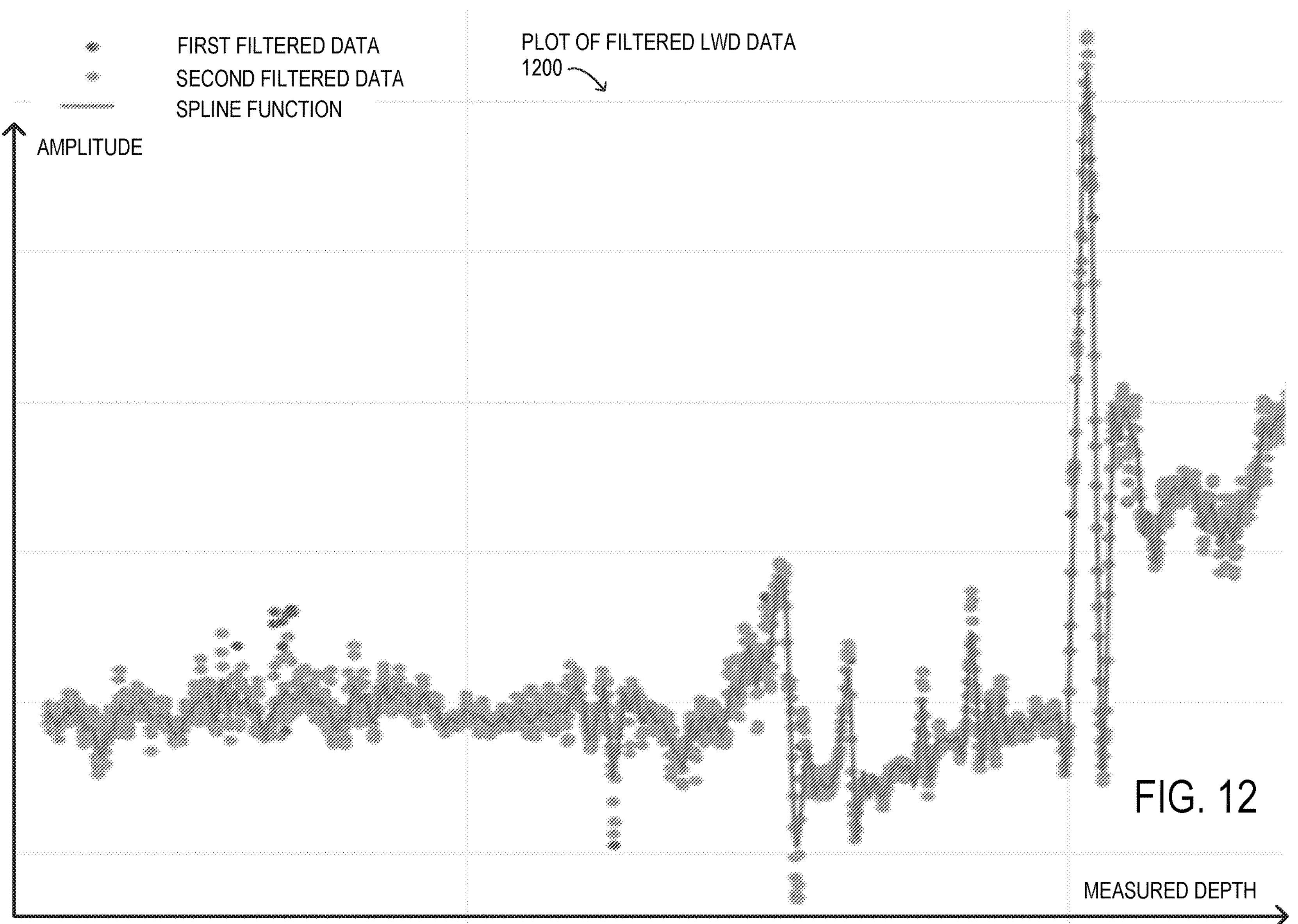
FIG. 12 is an example plot of filtered LWD data.

FIG. 12 shows a plot 1200 as an example of filter action and spline function fitting on the first filtered data using 10 data points per knot. FIG. 12 show a result of the spline function being fitted to the second filtered data. For example, in plot 1200 of FIG. 12, first filtered data points (dark dots) with a difference of more than 2 standard deviations from the spline curve are visible and have been removed as anomalies from the second filtered data (light dots) that is used to fit the spline function (solid line).

Figure 13:
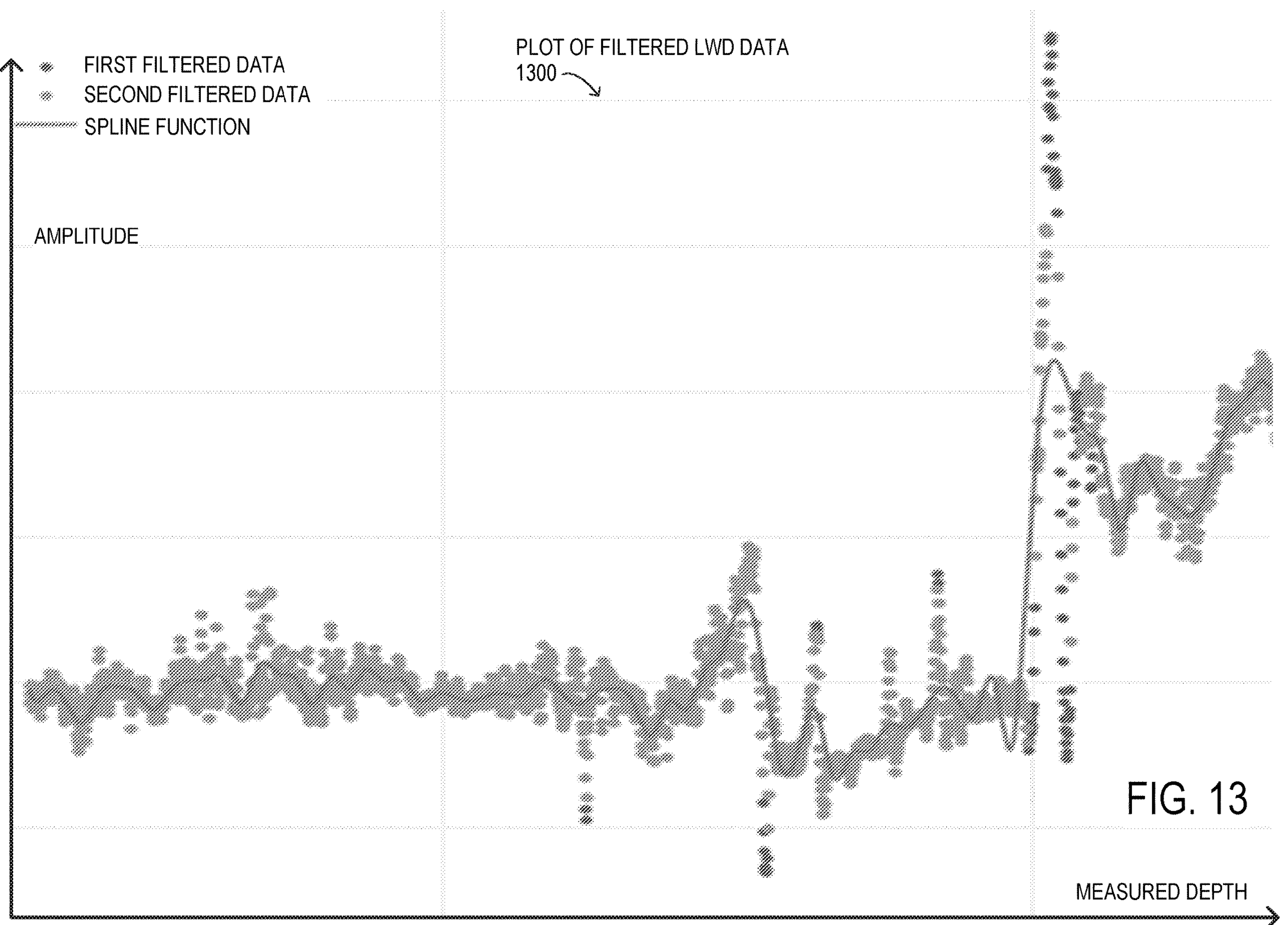
FIG. 13 is an example plot of filtered LWD data.

FIG. 13 shows a plot 1300 as an example of filter action and spline function fitting of the first filtered data using a 30 data points per knot. The wider knot spacing in plot 1300 as compared to plot 1200 results in a smoother spline, capturing less variation of the second filtered data. Anomalous data points from the first filtered data are visible in plot 1300 at a larger distance from the spline curve. Consequently, a larger number of first filtered data points may be flagged as anomalies (dark data points) in plot 1300 than with in plot 1200 of FIG. 12. The second filtered data is shown as orange data points.

Instead of directly filtering the raw data received as input in step 1102, in some embodiments, a transformation of the raw data may be filtered, which may be controlled by a software parameter that indicates whether the raw data are used directly or whether the raw data are transformed first. Various types of transformations may be used, such as skewness, Fourier, or another type of transformation.

One transformation that can be used for step 1102 is a logarithm. For example, the logarithmic value, by using the logarithmic function, can be applied to the raw data and then the remaining steps in method 1100 may be performed. It is noted that when the logarithm of the raw data is used to generate the second filtered data, the logarithm of the gamma ray value may transformed back from the logarithmic value by using the exponential function, while the spline coefficients are not transformed back from the logarithmic values. Thus, the spline coefficients may still in terms of the logarithm of gamma ray values. In this case, the user may need to first obtain the spline logarithm of gamma ray values from the logarithmic spline coefficients, and then transform the spline gamma values back from logarithmic values using the exponential function.

Another transformation that can be used for step 1102 is a rank transformation. A ranking is a relationship between a set of values such that, for any two values, the first value is either 'ranked higher than', 'ranked lower than' or 'ranked equal to' the second value. By reducing log data to a sequence of ordinal numbers, a rank transformation can be used to evaluate complex information in the log data according to certain criteria. Applying a rank transformation rather than the raw data may have certain advantages. For example, a rank transformation may be invariant under strictly monotonic transformations. In other words, if the log data were measured using equipment with an unknown offset, and/or an unknown linear (or nonlinear) scale response, the rank transformation of the log data may not be affected as long as the equipment response is monotonic. In another example, the rank transformation may be insensitive to outliers, which are log data values with excessive variance from a mean value. Outliers can have strong side effects on standard statistical estimates such as mean, standard deviation, L2 norm, etc. A rank transformation can significantly reduce the adverse effects of such outliers, since the rank of an outlier is always bounded, regardless of an error magnitude associated with the outlier.

The following advantages and improvements may be realized by the automated filtering and normalization of logging data disclosed herein.

Enable the use of geophysical logging measurements to autonomously steer a drill bit into a geological target.

Enable the use of drilling dynamics measurements to autonomously steer a drill bit into a geological target.

Enable the use of drilling fluid logging measurements to autonomously steer a drill bit into a geological target.

Enable the use of logging data as input to improve the performance of the drilling process.

Automatically filter logging data to improve autonomous steering algorithm performance, such as by reducing errors from anomalous input values.

Fit a spline function to the logging data.

Compute the difference between the logging data and the spline data.

Mark as anomalies any data points whose difference to the spline value exceeds a given threshold, and use a multiple of the standard deviation estimated from the logging data as the given threshold.

Iterate the filtering process to identify and remove anomalies.

Apply the same filtering process to a transformation of the input logged data instead of the input logged data, such as a rank transformation, a logarithm, a skewness transformation, a min-max transformation, a Fourier transformation, among others.

Enable the use of the filtered logging data to autonomously steer a wellbore to a geological target.

Instead of the filtered logging data, enable the use of a spline representation of the filtered logging data to steer a wellbore to a geological target.

Enable the combination of different types of filtered logging data to autonomously steer a drill bit into a geological target.

Enable the combination of different types of filtered logging data to improve the performance of the drilling process.

Enable the identification of vibrations from filtered sensor data and take corrective actions to suppress vibrations based on such filtered sensor data.

After the filtering of log data, as described previously, the log data may be normalized to enable meaningful analysis and comparison without scaling artefacts. The normalization of log data used during drilling is an issue that has significant consequences in the drilling industry. The handling and processing of such log data can consume significant resources, such as technical labor resources, as well as significant amounts of time during which productive activity of a drilling rig may be suspended, at least in part, which is undesirable. Furthermore, the processing and interpreting of log data, such as for stratigraphic analysis to ascertain TVD of a particular wellbore trajectory, either during drilling or post-drilling, may be dependent upon accurate and precise comparison of reference log data to LWD data from the wellbore, as well as accurate and precise comparisons of multiple reference log data to each other, as well as multiple LWD data from different tool runs along the same wellbore. However, without a corresponding accurate and precise amplitude normalization of such log data, any comparison or analysis is likely to introduce errors that can materially and negatively impact the stratigraphic analysis, thereby representing a significant source of error that is associated with economic losses, due to stratigraphic error in actual TVD of the wellbore. As defined herein, 'amplitude normalization' refers to a scaling of an amplitude (Y-axis) of data that is typically collected versus depth (X-axis). Because a human operator would be physically incapable of performing the methods for filtering and normalization described herein within a reasonable time frame for industrial utility (e.g. real-time analysis and drilling decisions while drilling), the methods of filtering and normalization disclosed herein represent substantially more than mere automation of manual or mental human activity. Rather, the results provided by the methods of filtering and normalization disclosed herein represent a unique and reliable approach to processing large volumes of log data, while enabling a high quality standard with wide-scale industrial application that is lacking and needed in conventional manual and computer-assisted methods.

The systems and methods for automated filtering and normalization of logging data for improved drilling performance is enabled for normalization of LWD data from a subject well and, if desired, from any one or more auxiliary reference log data (e.g., auxiliary typelogs) to a master reference log data that is specified for a wellbore. For example, for performing a stratigraphic analysis using gamma ray logs, when the LWD data for the subject well indicates the same or similar stratigraphic signatures as the master reference log data, but has some relative offset or scaling, a human operator might be able to pick out some of the correlated stratigraphic signatures, but experience suggests that humans perform with relatively low precision (e.g., repeatability), either from well to well, or from human to human, due to the subjective nature of human analysis. The lack of normalization in the log data may, however, prevent an automated computer-implementation from attaining even the relatively low level of quality and precision that the human operator can achieve, since corresponding stratigraphic features will still have larger amplitude misfit that is artificial due to scaling artefacts.

Accordingly, the systems and methods for automated filtering and normalization of logging data for improved drilling performance is disclosed herein to enable automated computer-implemented stratigraphic analysis of various log data with relatively high precision and wide-scale industrial applicability. By normalizing a set of log data to a known standard, such as a calibrated standard of reference log data, the systems and methods for automated filtering and normalization of logging data for improved drilling performance disclosed herein can provide accurate and precise calibration of log data. The systems and methods for automated filtering and normalization of logging data for improved drilling performance disclosed herein is suitable for preparing log data for manual analysis by a human operator as well as for automated analysis by a computer-implemented method, such as for stratigraphic analysis.

The systems and methods for automated filtering and normalization of logging data for improved drilling performance disclosed herein is enabled to normalize log data from any two different sources to each other. The sources are typically log data collected during drilling of a well, such as from a previously drilled well or a well being drilling. Log data collected from a previously drilled well is referred to as 'reference log data', while a well being drilled is referred to as a 'subject well'. Thus, the normalization can be performed for auxiliary reference log data relative to master reference log data, for reference log data to LWD data for the subject well, or for LWD data from the subject well for one tool run to another tool run.

The systems and methods for automated filtering and normalization of logging data for improved drilling performance disclosed herein may perform various operations, such as at least the following operations, for normalization of logged data.

When the log data for normalization are from the subject well, the log data may be restricted to vertical and curve sections of measured depth where stratigraphic analysis is meaningful. For example, a given cutoff inclination angle may be used to exclude lateral (horizontal) sections along the wellbore in the log data.

When the log data have too few measured depth data values before the lateral section, no normalization is performed. The minimum number of vertical data values before the lateral section can be a user-configurable parameter.

Log data from a well is analyzed from the beginning of the well, even if a tie-in point is defined further along the well.

When the normalized log data is reference log data, the entire set of reference log data is normalized (typelog).

The MD range of the log data to be normalized is correlated with a TVD range in the reference log data, in order to compare regions of similar stratigraphy, using a tie-in point.

For auxiliary reference log data, certain characteristics of the formation may be ascertained to make assumptions about the geology, such as expected bed dip, standard deviation thresholds, rolling window size for threshold comparison, etc.

A mean and standard deviation is calculated for depth sections of the LWD data from the subject well and the reference log data.

A threshold for filtering or smoothing the log data to remove outliers that fall outside a set number of standard deviations above or below the mean may be used and may be determined from log data over the full depth range of the subject well.

The threshold for filtering or smoothing the log data by removing outliers may be determined using a moving average (e.g., a rolling window) that may have more local sensitivity for a given depth range. For example, a threshold of 3 standard deviations may generally or initially be used and may be adapted to be greater or less based on a rolling window of local standard deviations.

Thus, the standard deviation used may be for the entire well or may be determined and used for a given rolling window or portion of the well. Another option may be to divide the data log(s) into segments and use varying thresholds for the different log segments. For example, one segment cold use two standard deviations from the mean as the threshold, while a different segment might use three standard deviations from the mean to define the threshold for determining outlier data points. To perform the amplitude normalization, offset and scale values are applied to the LWD data from the subject well to match the mean and standard deviation of the reference log data being used to normalize against.

The mean (μ) and standard deviation (σ) may be calculated for the subject well and for the master reference log data, given as:

Subject well: $\mu_w$, $\sigma_w$;

Master reference: $\mu_m$, $\sigma_m$;

Rolling window values for $\mu_m$ and $\sigma_m$ may also be used for depth-local adaptation and optimization;

An offset and scale for normalizing the subject well may be calculated as: offset $(\mu_m-[\mu_w\sigma_m/\sigma_w])$; and scale $\sigma_m$ law. For input log data $L_i$ the normalized output log data $L_o(\text{scale}*L_i)+\text{offset}$.

When new log data are received, such as for a newly drilled depth range during drilling, the values for offset and scale may initially be determined based on the raw values in the new data, as $offset_{new}$ and $scale_{new}$. The values $offset_{new}$ and $scale_{new}$ may then be compared to $offset_{prev}$ and $scale_{prev}$ as previously determined, such as from log data over a previous depth range. A differential threshold may then be applied in the comparison to make a decision whether or not to use $offset_{new}$ and $scale_{new}$, respectively, instead of $offset_{prev}$ and $scale_{prev}$. For example, a minimum differential threshold for a difference ($offset_{prev}-offset_{new}$) may be given by a parameter min_recalibration_offset_dif that must be exceeded for $offset_{new}$ to be used, otherwise $offset_{prev}$ is used. A minimum differential threshold for a difference ($scale_{prev}-scale_{new}$) may be given by a parameter min_recalibration_scale_dif that must be exceeded for $scale_{new}$ to be used, otherwise $scale_{prev}$ is used.

Figure 14:
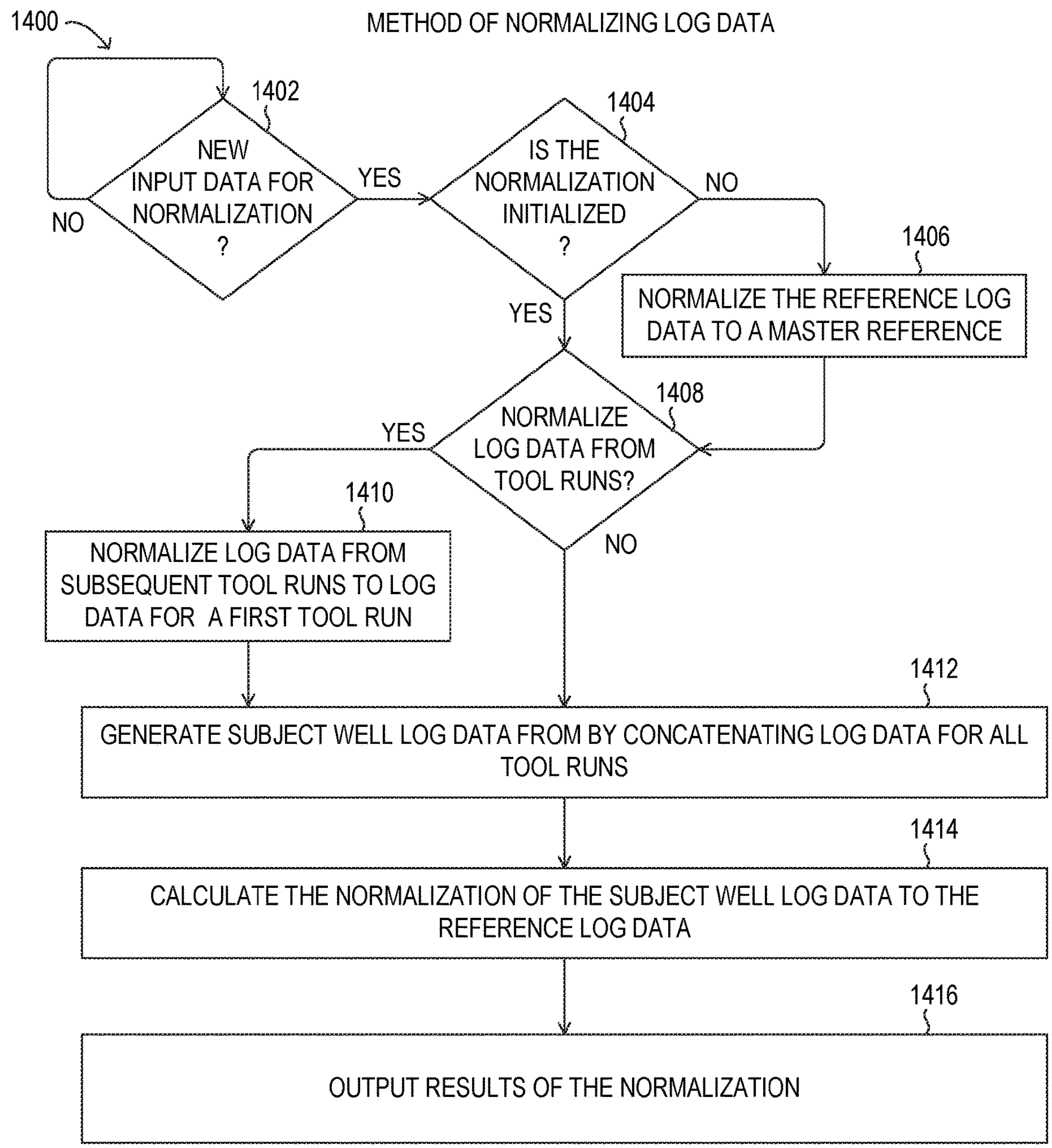
FIG. 14 is a flow chart depicting a method of normalizing log data.

Referring now to FIG. 14, a method 1400 for normalizing log data is shown in flow chart format. Certain operations in method 1400 may be omitted or rearranged in various embodiments. Method 1400 may be performed in a substantially similar context as method 1100, such as by the same computer system or control system, as described previously.

Method 1400 may begin with a decision at step 1402 whether new input data for normalization is available. When the result of step 1402 is NO and no new input data for normalization is available, method 1400 may loop back to step 1402 (polling for new input data). When the result of step 1402 is YES and new input data for normalization is available, at step 1404, a decision is made whether the normalization is initialized? When the result of step 1404 is NO and the normalization is not initialized, at step 1406, the reference log data is normalized to a master reference. When the result of step 1404 is YES and the normalization is initialized, and after step 1406, at step 1408 a decision is made whether log data from tool runs is to be normalized. In some implementations, the decision at step 1408 may be triggered or determined by indications of different tool runs in log data. In some cases, the decision at step 1408 may be triggered or determined by user input or by a user-defined parameter. When the result of step 1408 is YES and log data from tool runs is to be normalized, at step 1410, log data from subsequent tool runs are normalized to log data for a first tool run. (See also FIGS. 18, 19, and 22). When the result of step 1408 is NO and no log data from tool runs is to be normalized, and after step 1410, at step 1412, subject well log data is generated by concatenating log data from all tool runs. At step 1414, the normalization of the subject well log data to the reference log data is calculated. At step 1416, the results of the normalization are output. In some instances, at step 1416, the results of the normalization are output to steering control system 168 during drilling of the subject well.

For the purpose of normalizing LWD data such that like stratigraphic regions (signatures) from subject well log data and from reference well log data have minimal misfit and are able to match with a high likelihood, various different reference log data may be normalized to each other before normalization with the subject well log data. Because of the computer-implemented nature of the systems and methods for automated filtering and normalization of logging data for improved drilling performance disclosed herein, such pre-normalization among different reference log data sources can be performed to the same quality standard and efficiency as normalization of the subject well log data itself.

In various embodiments, the systems and methods for filtering and normalization may be enabled to normalize auxiliary reference data, when present with respect to a normalization of LWD data for the subject well Regardless of the normalization method selected for the LWD data of the subject well, the auxiliary reference data may be normalized using a full well standard deviation method. First, comparable depth regions between two sets of reference log data may be selected based on prior knowledge of the stratigraphy using layer information. Then, a normalization between a master reference log data set and an auxiliary reference log data set may include the following operations:

Identify stratigraphic layer depths from both the master reference and the auxiliary reference.

Identify a start depth and an end depth of the auxiliary reference.

Map the start depth and an end depth of the auxiliary reference onto the master reference using the stratigraphic layer depths (MisfitMapTypeLogCPU-.map_svds_with_geomodel( )).

Determine whether the mapped depth values are within or outside of the master reference depth range, and trim depth ranges accordingly. For example, when the auxiliary reference start depth maps to a shallower depth than a master reference starting depth, then the auxiliary reference start depth can be set deeper. Likewise, when the auxiliary reference start depth maps to a deeper depth than a master reference starting depth, then the master reference start depth can be set deeper.

Calculate mean and standard deviation for both master reference and auxiliary reference.

Calculate offset and scale for the auxiliary reference to normalize to the master reference and apply the offset and scale to the auxiliary reference.

Referring now to FIG. 15, a method 1500 for normalizing reference log data, initial setup, is shown in flow chart format. Certain operations in method 1500 may be omitted or rearranged in various embodiments. Method 1500 may be performed in a substantially similar context as method 1100, such as by the same computer system or control system, as described previously.

Method 1500 may begin at step 1502 by identifying and importing reference log files containing input reference log data from at least one reference well for normalization. The at least one reference wells in step 1502 may include a master reference. When additional reference wells are used in step 1502, the additional reference wells may be auxiliary references. At step 1504, the reference log data may be displayed using an alignment plot for visual inspection by a user. At step 1506, offsets and scale factors for linear normalization of auxiliary reference log data with respect to first reference log data used as a calibration standard are calculated. At step 1508, an output correlation matrix is calculated and values are plotted on a map. The map may be a heat map generated based on the output correlation matrix, as described in co-pending U.S. patent application Ser. No. 16/821,397, titled "Steering a Wellbore Using Stratigraphic Misfit Heat Maps", which is incorporated by reference in its entirety. At step 1510, a stratigraphic tie-in point for log data from a subject well, along with other configuration data for normalization of the log data from the subject well, are determined. The tie-in point and other configuration data may be pre-determined or automatically accessed, such as for automated operation, in step 1510. In some cases, the tie-in point and other configuration data may be obtained from user input provided by a user in step 1510. At step 1512, a decision may be made whether the normalization will be performed during drilling of the subject well. When the result of step 1512 is YES and the normalization will be performed during drilling of the subject well, method 1500 proceeds with method 1600 (see FIG. 16). When the result of step 1512 is NO and the normalization will not be performed during drilling of the subject well, method 1500 proceeds with method 1700 (see FIG. 17, post-processing).

Figure 16:
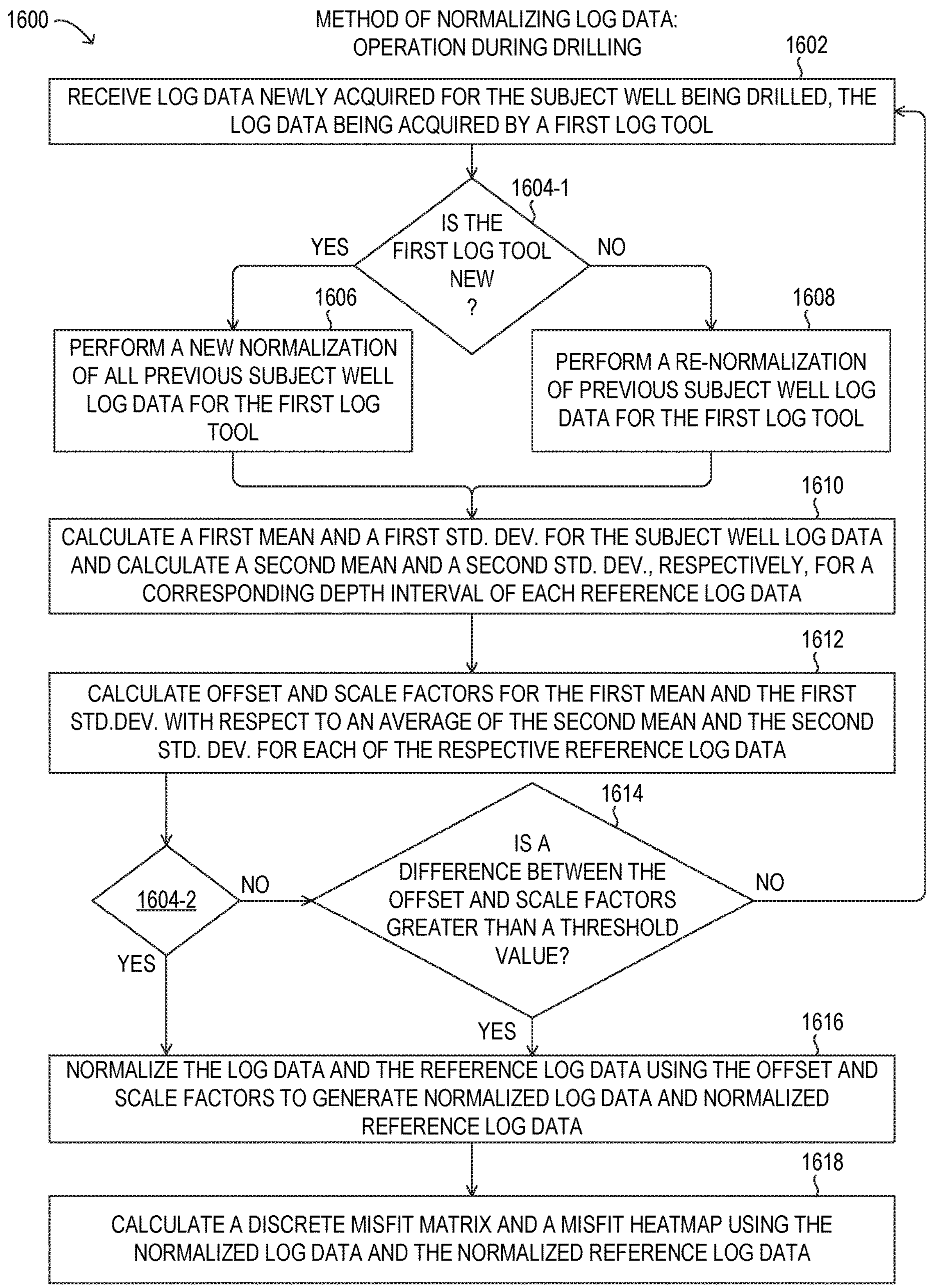
FIG. 16 is a flow chart depicting a method of normalizing log data, operation during drilling.

Referring now to FIG. 16, a method 1600 for normalizing reference log data, operation during drilling, is shown in flow chart format. Certain operations in method 1600 may be omitted or rearranged in various embodiments. Method 1600 may be performed in a substantially similar context as method 1100, such as by the same computer system or control system, as described previously.

Method 1600 may begin at step 1602 by receiving log data newly acquired for the subject well being drilled, the log data being acquired by a first log tool. At step 1604-1 a first decision is made whether the first log tool is new. When the result of step 1604-1 is YES, and the first log tool is new, at step 1606, a new normalization of all previous subject well log data for the first log tool is performed. When the result of step 1604-1 is no, and the first log tool is not new, at step 1608, a re-normalization of previous subject well log data for the first log tool is performed. After steps 1606 and 1608, at step 1610, a first mean and a first standard deviation for the subject well log data are calculated, and a second mean and a second standard deviation, respectively, for a corresponding depth interval of each reference log data are calculated. At step 1612, offset and scale factors for the first mean and the first standard deviation with respect to an average of the second mean and the second standard deviation for each of the respective reference log data are calculated. At step 1602-2, a second decision is made whether the first log tool is new. When the result of step 1604-2 is YES, and the first log tool is new, method 1600 proceeds to step 1616. When the result of step 1604-1 is NO, and the first log tool is not new, at step 1614, a decision is made whether a difference between the offset and scale factors is greater than a threshold value. When the result of step 1614 is NO, and the difference between the offset and scale factors is not greater than the threshold value, method 1600 may loop back to step 1602. When the result of step 1614 is YES, and the difference between the offset and scale factors is greater than the threshold value, at step 1616, the log data and the reference log data are normalized using the offset and scale factors to generate normalized log data and normalized reference log data. At step 1618, a discrete misfit matrix and a misfit heatmap are calculated using the normalized log data and the normalized reference log data.

Referring now to FIG. 17, a method 1700 for normalizing reference log data, post-drilling operation, is shown in flow chart format. Certain operations in method 1700 may be omitted or rearranged in various embodiments. Method 1700 may be performed in a substantially similar context as method 1100, such as by the same computer system or control system, as described previously.

Method 1700 may begin at step 1702 by selecting recorded log data of a drilled well for normalization corresponding to reference log data in depth. At step 1704, a single tool run in the recorded log data is selected when multiple tool runs are identified. It is noted that method 1700 may be repeated for other tool runs in the recorded data. At step 1706, a first mean and a first standard deviation are calculated for the drilled well log data and a second mean and a second standard deviation, respectively, are calculated for a corresponding depth interval of each reference log data. At step 1708, offset and scale factors are calculated for the first mean and the first standard deviation with respect to an average of the second mean and the second standard deviation for the reference log data. At step 1710, the log data and the reference log data are normalized using the offset and scale factors to generate normalized log data and normalized reference log data. At step 1712, a discrete misfit matrix and a misfit heatmap are calculated using the normalized the log data and the normalized reference log data.

During drilling of the subject well, it is common for an LWD logging tool, such as a gamma ray emission sensor, to be tripped out for a new tool one or more times. Because of differences in calibration, operation, and conditions that can occur, the LWD logging tool may be inconsistently calibrated among the multiple tool runs. Therefore, the systems and methods of filtering and normalizing log data are enabled to individually normalize log data from different tool runs in order to produce uniformly calibrated log data that is usable for autocorrelation.

Figure 18:
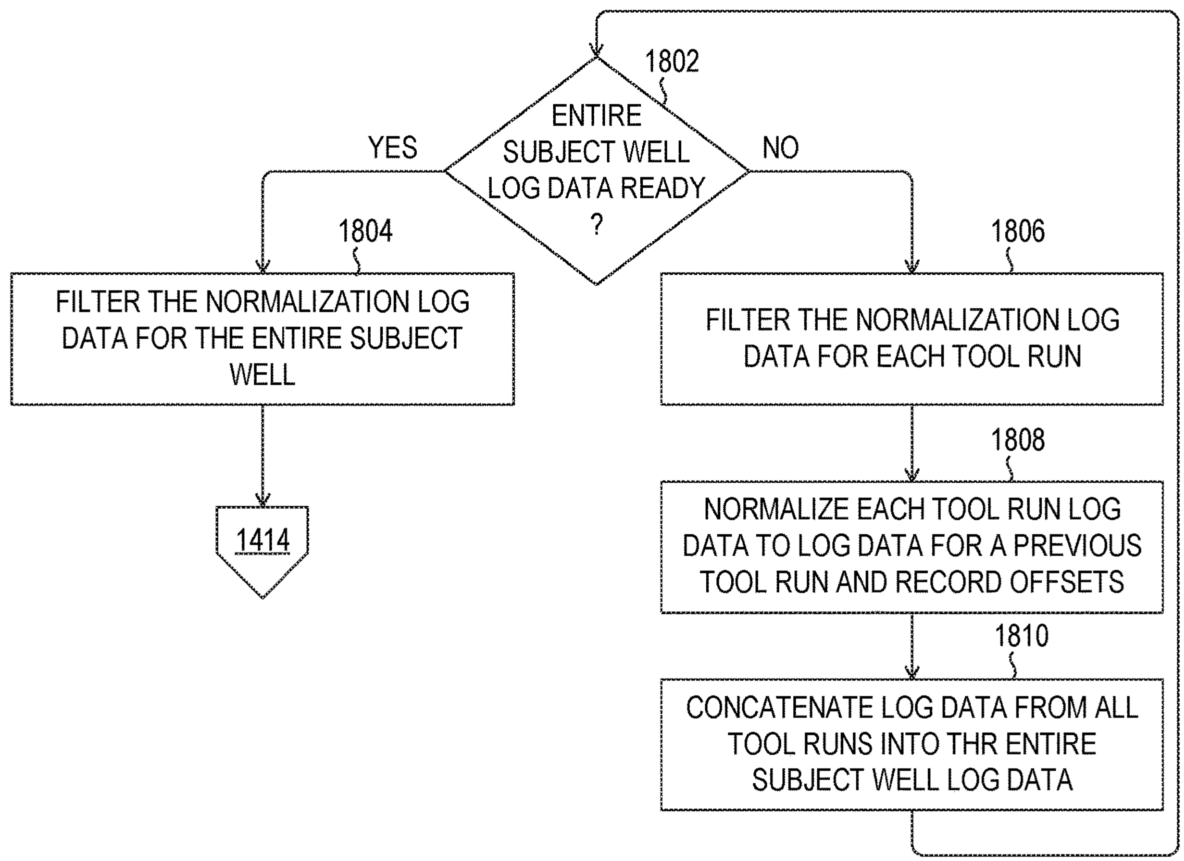
FIG. 18 is a flow chart depicting a method of normalizing log data, concatenating tool runs.

Referring now to FIG. 18, a method 1800 for normalizing reference log data, concatenating tool runs, is shown in flow chart format. Certain operations in method 1800 may be omitted or rearranged in various embodiments. Method 1800 may be performed in a substantially similar context as method 1100, such as by the same computer system or control system, as described previously.

Method 1800 may begin at step 1802 with a decision whether log data for an entire subject well are ready. When the result of step 1802 is YES, and log data for the entire subject well are ready, at step 1804, the normalization log data for the entire subject well may be filtered.

For example, method 1100 may be used at step 1804. After step 1804, method 1800 may proceed with step 1414 to complete the remaining steps in method 1400. When the result of step 1802 is NO, and log data for the entire subject well are not ready, at step 1806, the normalization log data for each tool run are filtered. For example, method 1100 may be used at step 1806. At step 1808, each tool run log data is normalized to log data for a previous tool run and offsets are recorded (see also FIG. 19, method 1808). At step 1810, log data from all tool runs is concatenated into the entire subject well log data.

The systems and methods for filtering and normalization disclosed herein may also be used to normalize log data from multiple tool runs to each other to create log data that is consistent in amplitude. The linear amplitude normalization uses a offset and a scale factor that is used to shift and scale each segment of tool run log data to be consistent with other segments of tool run log data. In the case of multiple tool runs, offsets and scales can be calculated to normalize log data from subsequent tool runs to an initial tool run. As a result, log data for each successive tool run has uniform amplitude normalization to the initial tool run. Specifically, three cases of normalization of log data among different tool runs are defined:

- case 1: there is some overlapping log data in between two tool runs;
- case 2: there is no overlapping data between two tool runs and there is no significant depth gap in data between the two tool runs; and
- case 3: there is no overlapping data between two tool runs and there is a significant depth gap in data between the two tool runs. Each of the cases 1-3 handled separately as described below and with respect to FIG. 19.

Case 1: A given tool run has an overlapping depth region of log data with a previous tool run, meaning there is a depth region of log data where the same geologic signal was measured and recorded by both tool runs. The overlapping region of log data can provide useful information about how the individual tools are calibrated relative to one another. The process for determining the offset and scale needed to calibrate the second tool run to the first tool run in case 1 involves isolating the region of overlap is isolated and the mean and standard deviation for both tool runs in the overlap region are calculated. The offset and scale are then calculated using these means and standard deviations.

Case 2: There is no region of overlapping with the previous tool run, but the log data from the tool run picks up almost exactly where the previous tool run ended. In this case it is assumed that the log curve follows the same trend before and after the tool run change. Then, an offset is calculated that correlates with the trend. In case 2, no scale factor is calculated and the scale factor is always set to one. In some results, an artificially created discontinuity in amplitude right at the tool run change may be observed. In order to algorithmically estimate the magnitude of offset needed to match the amplitude of the tool runs, the following steps are performed:

Isolate the first N points of the tool run and the last N points of the previous tool run (N is a model property called n_points_for_toolrun_calibration).

Smooth the isolated N points on each tool run with a Savitzky-Golay filter to capture the general trend of the data before and after the tool run change.

The offset is applied to the log data of the subsequent tool run and is a difference between the last point of the smoothed log from the previous tool run and the first point of the smoothed log of the subsequent tool run.

Case 3: There is no region of depth overlap with the previous tool run and there is a depth gap between when the previous tool run ends and then the subsequent tool run begins. In this case there is no information usable to normalize the subsequent log data to the previous log data, and so, offset=0 and scale=1.

Figure 19:
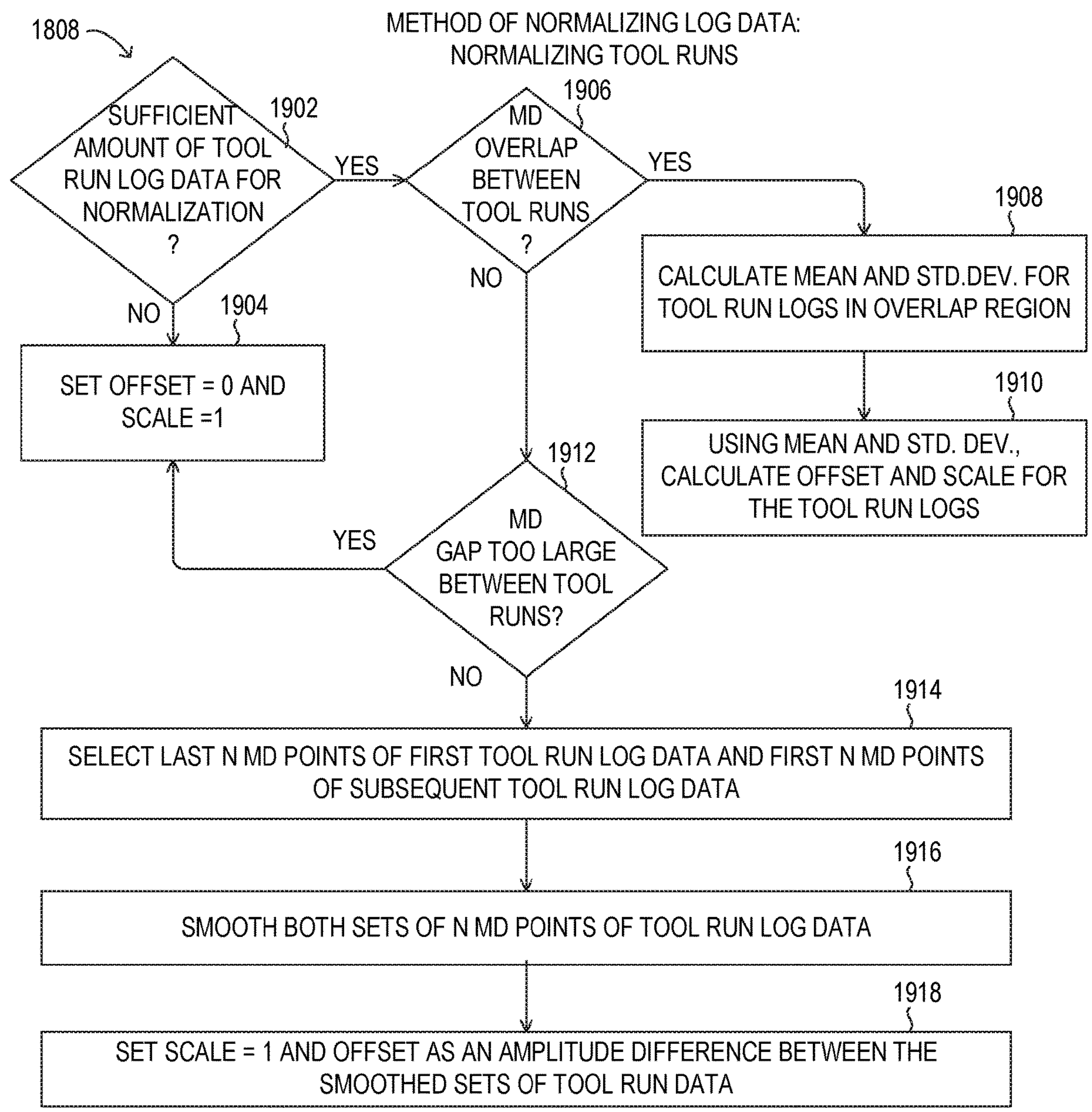
FIG. 19 is a flow chart depicting a method of normalizing log data, normalizing tool runs.

Referring now to FIG. 19, a method 1808 for normalizing reference log data, normalizing tool runs, is shown in flow chart format. Certain operations in method 1808 may be omitted or rearranged in various embodiments. Method 1808 may be performed in a substantially similar context as method 1100, such as by the same computer system or control system, as described previously.

Method 1808 may begin at step 1902 with a decision whether a sufficient amount of tool run log data for normalization is available. When the result of step 1902 is NO and a sufficient amount of tool run log data for normalization is not available, at step 1804, offset is set to 0 and scale is set to 1, and method 1808 may end. When the result of step 1902 is YES and a sufficient amount of tool run log data for normalization is available, at step 1906, a further decision is made whether there is an MD overlap between tool runs. When the result of step 1906 is YES and there is an MD overlap between tool runs, at step 1908, calculate mean and standard deviation for tool run logs in an overlap region are calculated. At step 1910, using mean and standard deviation, offset and scale for the tool run logs are calculated. When the result of step 1906 is NO and there is no MD overlap between tool runs, at step 1912, a further decision is made whether the MD gap is too large between the tool runs. When the result of step 1912 is YES and the MD gap is too large between tool runs, method 1808 may proceed to step 1904. When the result of step 1912 is NO and the MD gap is not too large between tool runs, at step 1914, the last N MD points of first tool run log data and first N MD points of subsequent tool run log data are selected. At step 1916, both sets of N MD points of tool run log data are smoothed. At step 1918, scale=1 is set and offset is set as an amplitude difference between the smoothed sets of tool run data.

Figure 20:
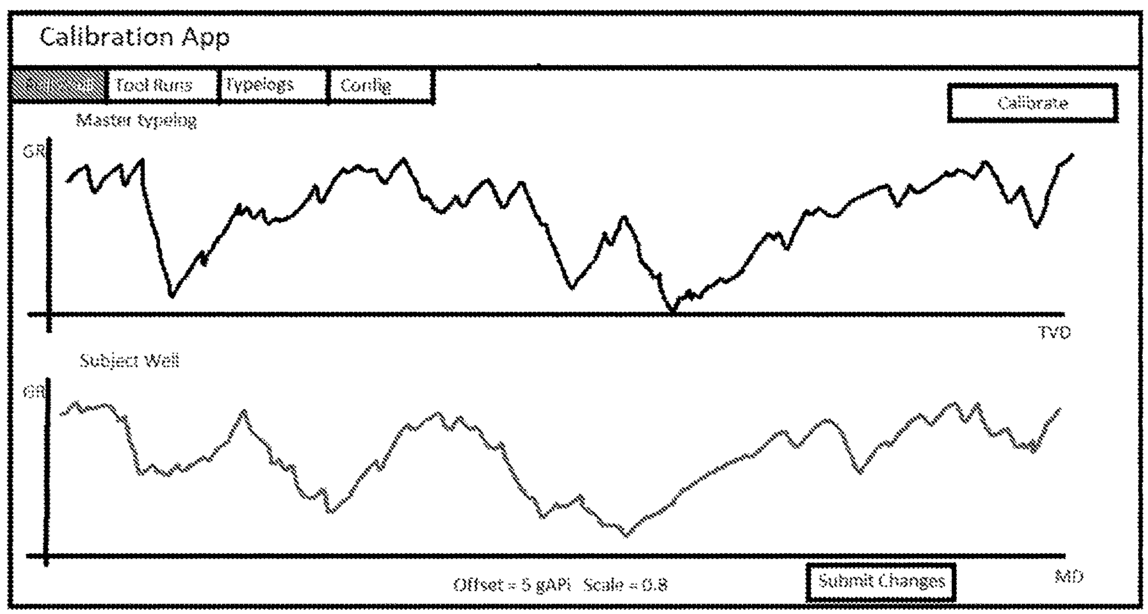
FIG. 20 is a user interface depicting filtering and normalization of an entire well.
Figure 21:
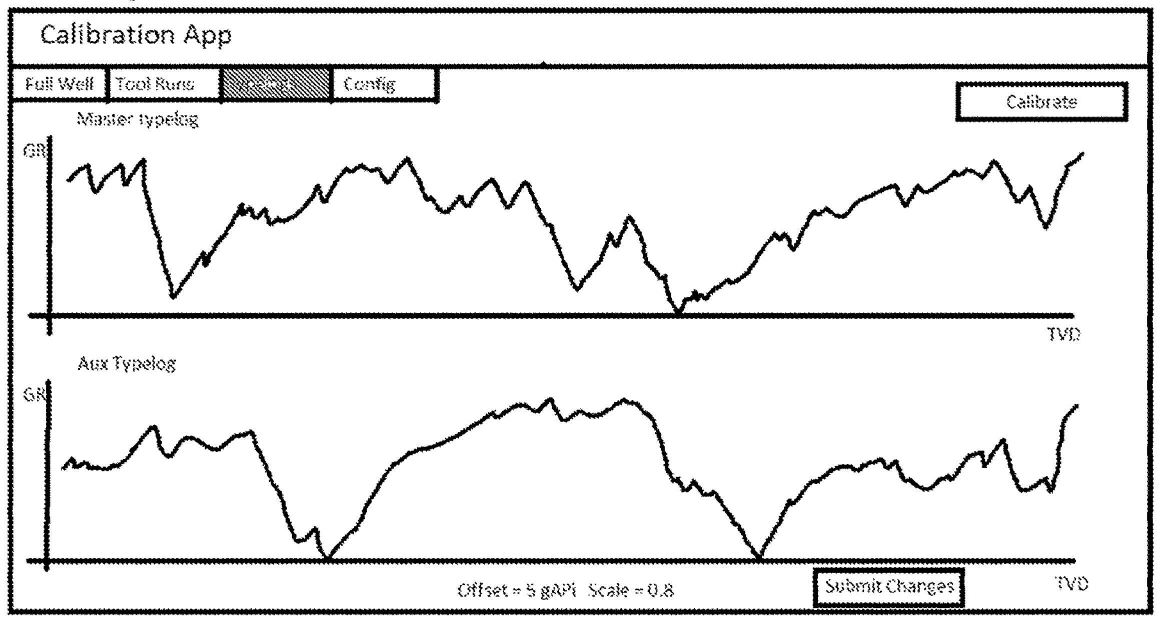
FIG. 21 is a user interface depicting filtering and normalization of auxiliary reference log data for a well.
Figure 22:
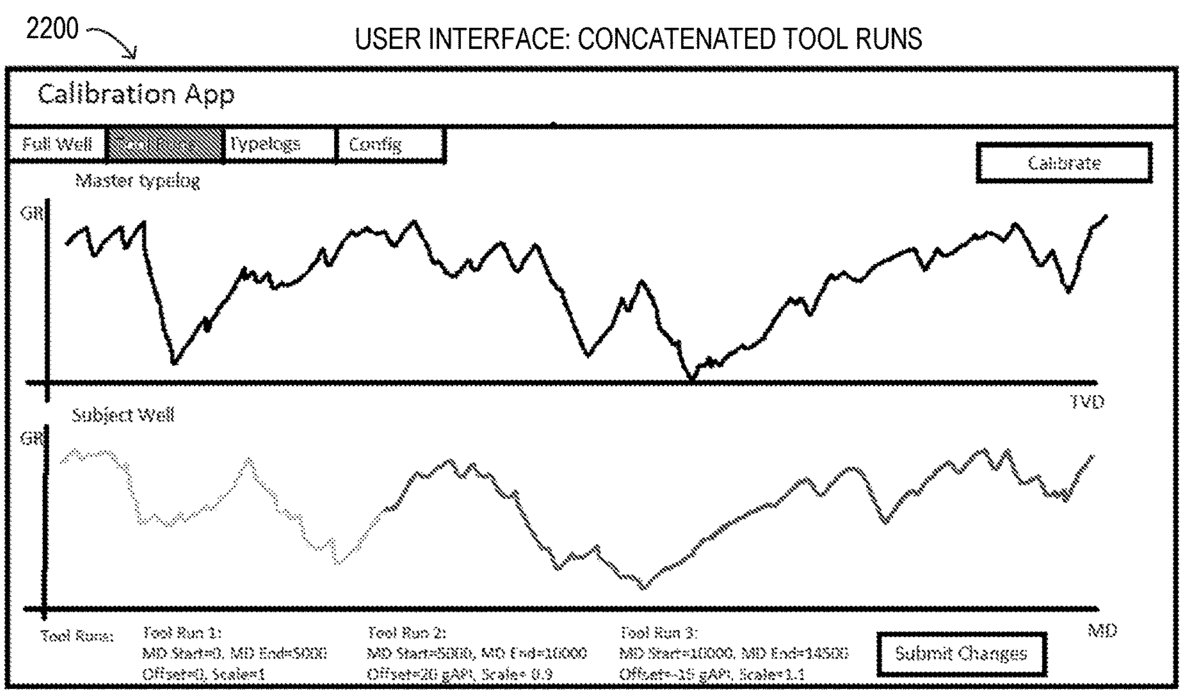
FIG. 22 is a user interface depicting filtering and normalization of concatenated tool runs of a well.

Referring now to FIGS. 20, 21, and 22, user interfaces of a software application for filtering and normalizing log data, as disclosed herein, are depicted. The user interfaces refer to normalization as calibration. The user interfaces in FIGS. 20, 21, and 22 show two log data plots versus a common depth axis shown in TVD: a top log data plot shows master reference log data (Master typelog), while different bottom plots are shown in the respective figures. In FIG. 20, a user interface 2000 shows a second bottom plot of log data for an entire subject well. In FIG. 21, a user interface 2100 shows a second bottom plot of log data for an auxiliary reference (Aux typelog). In FIG. 22, a use interface 2200 shows a second bottom plot of log data from concatenated tool runs (shown with different shaded lines) for a subject well.

Figure 23:
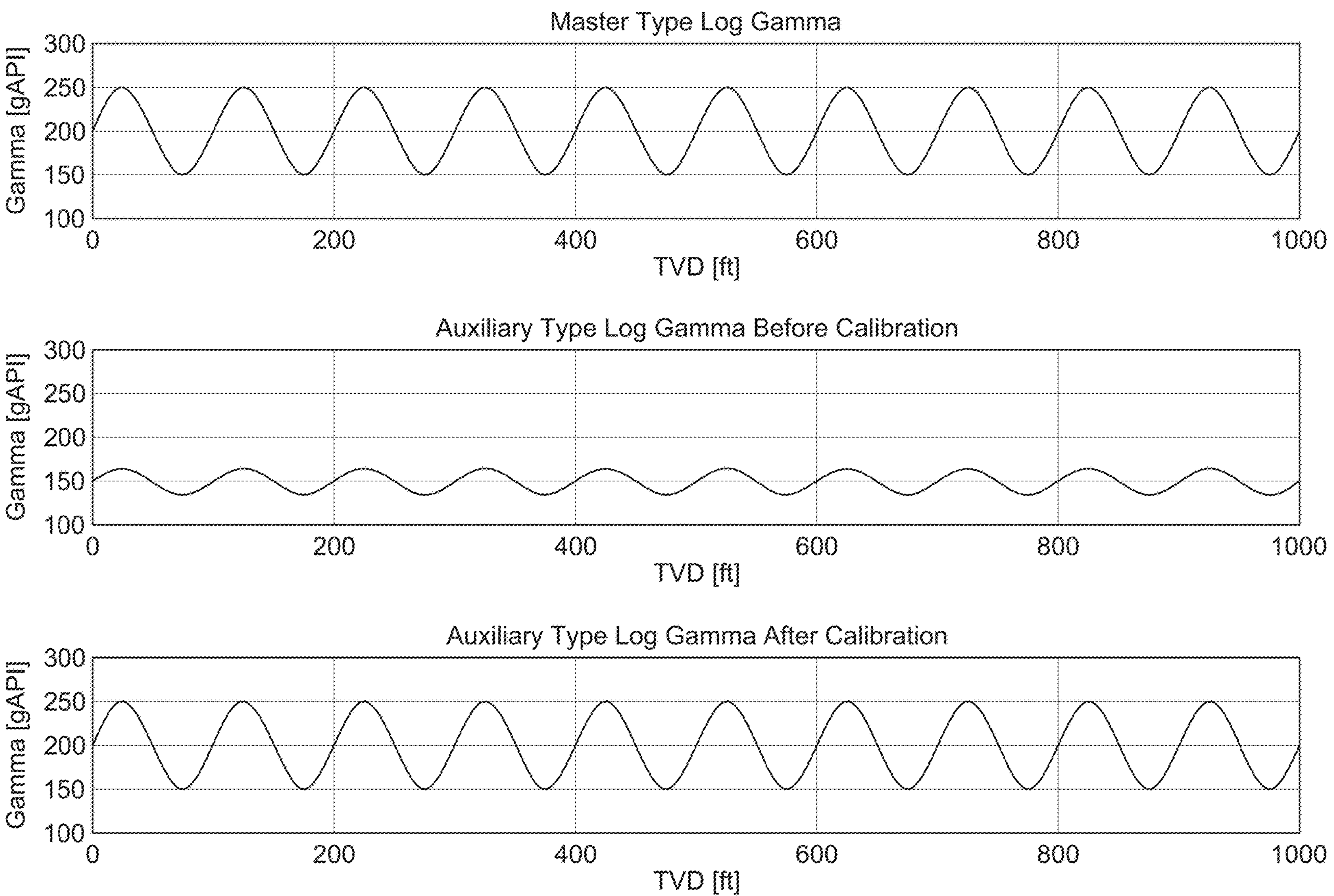
FIG. 23 depicts plots of log data used filtering and normalizing log data.
Figure 24:
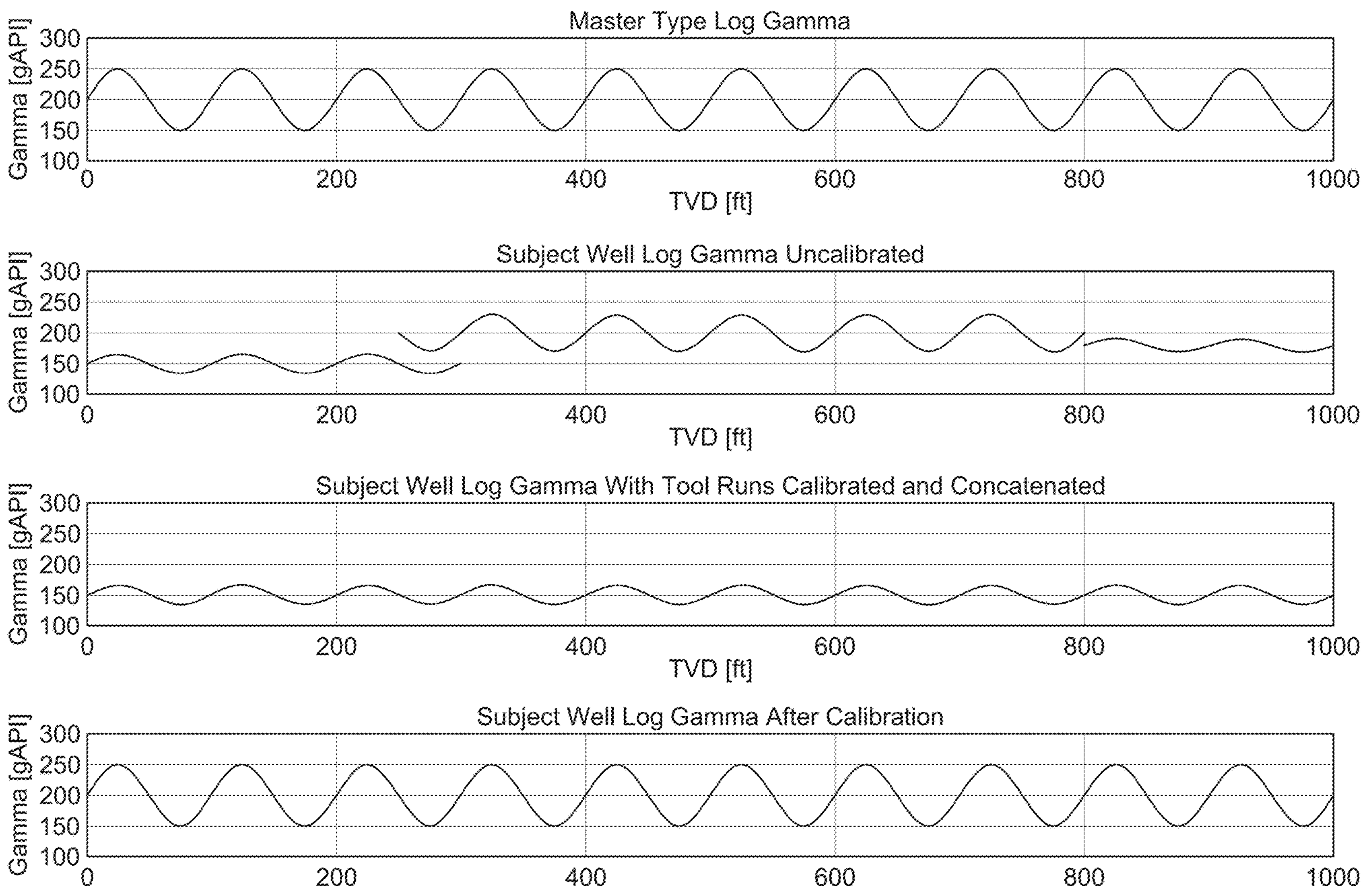
FIG. 24 plots of log data used filtering and normalizing log data.

Referring now to FIGS. 23 and 24, plots of log data used filtering and normalizing log data, as disclosed herein, are depicted. In some implementations, the plots in FIGS. 23 and 24 may be used for a user interface in a software application. The plots in FIGS. 23 and 24 depict the results of filtering and normalizing log data, as disclosed herein, using idealized reference data and log data to show mathematical relationships and operations. It is noted that the idealized data curves shown in FIGS. 23 and 24 may be replaced with actual measured log data to achieve the same results.

In FIG. 23, a calibration/normalization of auxiliary reference log data, shown in the middle plot, with respect to master reference log data, shown in the upper plot, is depicted. After the calibration/normalization, the output auxiliary reference log data are shown in the lower plot, and correspond to the master reference log data. It is noted that both offset and scale have been corrected in the output auxiliary reference log data are shown in the lower plot.

In FIG. 24, a calibration/normalization of subject well log data, shown in the upper middle plot, with respect to master reference log data, shown in the upper plot, is depicted. The subject well log data, shown in the upper middle plot, is split up into different tool run log data over different depth ranges. In the lower middle plot, a first step of normalizing the different tool run log data into a single unified log for the entire well has been performed. It is noted that a first overlap in the upper middle plot from different tool runs provides common log data from both tool runs over the overlapped depth range, and may use the offset from the previous tool run log data for the subsequent tool run log. A second overlap provides little or no common log data since there is no overlapped depth range. In the lower plot, output subject well log data that is normalized to the master reference log data for all tool run logs are shown.

Correlation of data logs for wells is a typical practice. More recently, however, various systems and methods have been developed to assist with the data log correlation process, and thereby, improve the drilling process. For example, one or more computer systems can be used to automate some or all aspects of the correlation, such as using multiple logs and multiple types of information essentially simultaneously for the correlation, as disclosed herein. Also, the computer system can be used for displaying one or more correlations in particular ways to assist a user in making one or more decisions, such as during drilling or while operating steering control system 168 to control drilling and steering of drilling. Examples of such systems and methods for automatic correlation of log data are disclosed and described in U.S. patent application Ser. No. 16/252,439, entitled "System and Method for Analysis and Control of Drilling Mud and Additives", published as US Patent Publication No. 2019/0226336A1 on Jul. 25, 2019; U.S. patent application Ser. No. 16/781,460, entitled "Downhole Display"; U.S. patent application Ser. No. 15/428,239, entitled "TVD Corrected Geosteer", published as US Patent Publication No. 2017/0152739A1 on Jun. 1, 2017; U.S. Pat. No. 10,042,081, entitled "System and Method for Dynamic Formation Detection Using Dynamic Depth Warping", issued on Aug. 7, 2018; U.S. patent application Ser. No. 14/733,448, entitled "System and Method for Surface Steerable Drilling to Provide Formation Mechanical Analysis", published as US Patent Publication No. 2015/0377003A1 on Dec. 13, 2015; and U.S. patent application Ser. No. 16/780,503, entitled "Geosteering Methods and Systems for Improved Drilling Performance", each of which is hereby fully incorporated by reference herein as if fully set forth in this disclosure.

As disclosed herein, systems and methods for automated filtering and normalization of logging data for improved drilling performance may enable smoothing and amplitude scaling of log data for meaningful comparison and analysis without scaling artefacts. The logging data may be collected from downhole sensors or may be recorded by a control system used for drilling. A computer implemented method may enable industrial scale automated filtering and normalization of logging data, including calibration to a known standard. In particular, the filtering and normalization may be used for stratigraphic analysis to correlate true vertical depth to measured depth along a wellbore.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for drilling a well, the method comprising:
- receiving, by a computer system, reference well log data;
- receiving, by the computer system, subject well log data from a wellbore being drilled;
- determining, by the computer system, a first mean and a first standard deviation for the subject well log data;
- determining, by the computer system, a second mean and a second standard deviation for the reference well log data;
- determining, by the computer system, a first offset factor and a first scale factor responsive to the first mean and first standard deviation and the second mean and the second standard deviation;
- determining, by the computer system, whether a difference between the first offset factor and the first scale factor exceeds a threshold therefor;
- responsive to determining that the difference between the first offset factor and the first scale factor exceeds the threshold, normalizing, by the computer system, the reference well log data and the subject well log data using the first offset factor and the first scale factor; and
- using the normalized subject well log data to steer drilling of the wellbore by sending, by the computer system, instructions causing a top drive to apply a modified torque and/or weight on bit (WOB) to a drill bit, based on a drilling model computed as a function of the normalized subject well log data, to drill the wellbore.

2. The method according to claim 1, wherein the reference well log data comprises a master reference well log.

3. The method according to claim 2, wherein the reference well log data further comprises one or more auxiliary well logs.

4. The method according to claim 1, wherein normalizing the reference well log data and the subject well log data comprises adjusting an amplitude of the reference well log data and the subject well log data to a common scaling.

5. The method according to claim 1, wherein using the normalized subject well log data comprises:
- correlating, by the computer system, a portion of the normalized subject well log data with a portion of the reference well log data;
- responsive to the correlation, determining, by the computer system, a location of a bottom hole assembly (BHA) within the wellbore; and
- responsive to the determined location of the BHA, adjusting one or more drilling parameters to drill from the determined location of the BHA to a target location.

6. The method according to claim 1, wherein the offset factor may be determined as offset=$(\mu_m-[\mu_w\ \ \sigma_m/\sigma_w])$, wherein $\mu_m$ is the mean of the reference well log data, $\mu_w$ is the mean of the subject well log data, $\sigma_m$ is the standard deviation of the reference well log data, and $\sigma_w$ is the standard deviation of the subject well log data.

7. The method according to claim 1, wherein the scale factor may be determined as scale=$\sigma_m/\sigma_w$, wherein $\sigma_m$ is the standard deviation of the reference well log data and $\sigma_w$ is the standard deviation of the subject well log data.

8. The method according to claim 1, wherein the offset factor may be determined as offset=$(\mu_m-[\mu_w\ \ \sigma_m/\sigma_w])$, wherein the scale factor may be determined as scale=$\sigma_m/\sigma_w$, and the normalized log data 1 may be determined as $L_o$=(scale*$L_i$)+offset, wherein $\mu_m$ is the mean of the reference well log data, $\mu_w$ is the mean of the subject well log data, $\sigma_m$ is the standard deviation of the reference well log data, and $\sigma_w$ is the standard deviation of the subject well log data.

9. The method according to claim 1, wherein the reference well log data and the subject well log data comprise at least one of: gamma ray emission measurements, hardness measurements, neutron density measurements, resistivity measurements, ductility measurements, electrical conductivity measurements, porosity measurements, density measurements, confined compressive strength measurements, sonic velocity measurements, rate of penetration, weight on bit, mechanical specific energy, torque at the top drive, drilling fluid flow rate, drilling fluid pressure, differential pressure, and rotational velocity.

10. A system for drilling a well, the system comprising:
- a processor;
- a memory coupled to the processor, wherein the memory comprises instructions executable by the processor for:
- receiving reference well log data;
- receiving subject well log data for a wellbore during drilling thereof;
- determining an indication that the reference well log data, the subject well log data, or both should be normalized;
- responsive to determining an indication that the reference well log data, the subject well log data, or both should be normalized, normalizing the reference well log data, the subject well log data, or both;
- correlating the normalized reference well log data with the subject well log data, the reference well log data with the normalized subject well log data, or the normalized reference well log data with the normalized subject well log data;
- responsive to the correlation, determining a location of a bottom hole assembly (BHA) within the wellbore; and responsive to the determined location of the BHA, sending one or more signals to a control system coupled to a drilling rig to drill the wellbore by sending instructions causing a top drive of the drilling rig to apply a modified torque and/or weight on bit (WOB) to a drill bit of the drilling rig based on a drilling model computed as a function of the normalized subject well log data.

11. The system according to claim 10, wherein the instructions further comprise instructions for:

determining a first mean and a first standard deviation for the subject well log data;

determining a second mean and a second standard deviation for the reference well log data; and determining a first offset factor and a first scale factor responsive to the first mean and first standard deviation and the second mean and the second standard deviation.

12. The system according to claim 11, wherein the instructions for determining an indication of whether the reference well log data, the subject well log data, or both should be normalized further comprise instructions for determining whether a difference between the first offset factor and the first scale factor exceeds a threshold therefor.

13. The system according to claim 12, wherein the offset factor may be determined as offset=$(\mu_m-[\mu_w\ \sigma_m/\sigma_w])$, wherein $\mu_m$ is the mean of the reference well log data, $\mu_w$ is the mean of the subject well log data, $\sigma_m$ is the standard deviation of the reference well log data, and $\sigma_w$ is the standard deviation of the subject well log data.

14. The system according to claim 12, wherein the scale factor may be determined as scale=$\sigma_m/\sigma_w$, wherein $\sigma_m$ is the standard deviation of the reference well log data and $\sigma_w$ is the standard deviation of the subject well log data.

15. The system according to claim 11, wherein the offset factor may be determined as offset=$(\mu_m-[\mu_w\ \sigma_m/\sigma_w])$, wherein the scale factor may be determined as scale=$\sigma_m/\sigma_w$, and the normalized log data 1 may be determined as $L_o$=(scale*$L_i$)+offset, wherein $\mu_m$ is the mean of the reference well log data, $\mu_w$ is the mean of the subject well log data, $\sigma_m$ is the standard deviation of the reference well log data, and $\sigma_w$ is the standard deviation of the subject well log data.

16. The system according to claim 10, further comprising instructions for generating a misfit heat map based on the normalized reference well log data, the normalized subject well log data, or both.

17. The system according to claim 10, further comprising instructions for determining whether a logging tool used to generate the subject well log data has been used previously in the wellbore to generate subject well log data, and, responsive to determining that the logging tool has not been used previously to generate subject well log data, performing a new normalization of all previous subject well log data.

18. The system according to claim 10, further comprising instructions for determining whether a logging tool used to generate the subject well log data has been used previously in the wellbore to generate subject well log data, and, responsive to determining that the logging tool has been used previously to generate subject well log data, performing a re-normalization of subject well log data.

19. The system according to claim 10, wherein the instructions comprise instructions for normalizing both the reference well log data and the subject well log data.

20. The system according to claim 10, wherein the reference well log data and the subject well log data comprise at least one of: gamma ray emission measurements, hardness measurements, neutron density measurements, resistivity measurements, ductility measurements, electrical conductivity measurements, porosity measurements, density measurements, confined compressive strength measurements, sonic velocity measurements, rate of penetration, weight on bit, mechanical specific energy, torque at the top drive, drilling fluid flow rate, drilling fluid pressure, differential pressure, and rotational velocity.

* * * * *